(12) United States Patent
Katenbrink

(10) Patent No.: US 11,971,831 B1
(45) Date of Patent: Apr. 30, 2024

(54) FIRST-IN, FIRST-OUT BUFFER

(71) Applicant: Arm Limited, Cambridge (GB)

(72) Inventor: Julian Katenbrink, Ely (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/077,289

(22) Filed: Dec. 8, 2022

(51) Int. Cl.
*G06F 13/16* (2006.01)

(52) U.S. Cl.
CPC ...... *G06F 13/1673* (2013.01); *G06F 13/1689* (2013.01)

(58) Field of Classification Search
CPC .................. G06F 13/1673; G06F 13/1689
See application file for complete search history.

(56) References Cited

U.S. PATENT DOCUMENTS

| | | | | |
|---|---|---|---|---|
| 8,301,932 | B2 * | 10/2012 | Hay .................. | G06F 5/10 713/400 |
| 8,867,573 | B2 * | 10/2014 | Kolinummi ......... | G06F 13/4059 713/400 |
| 9,478,272 | B1 * | 10/2016 | Grenier .............. | G11C 8/16 |
| 9,594,396 | B2 * | 3/2017 | Turner ............... | G06F 5/12 |
| 11,061,432 | B2 * | 7/2021 | Sarda ................. | G06F 1/10 |
| 11,526,193 | B2 * | 12/2022 | Ranganathan ...... | G06F 1/10 |
| 2010/0030940 | A1 * | 2/2010 | Gilad ................. | G06F 13/1673 710/305 |
| 2012/0331190 | A1 * | 12/2012 | Nakagawa .......... | G06F 13/4059 710/57 |
| 2016/0034409 | A1 * | 2/2016 | Kim .................... | G06F 13/404 710/110 |
| 2018/0095910 | A1 * | 4/2018 | Kulick ................ | G06F 13/1673 |
| 2018/0181503 | A1 * | 6/2018 | Nicol ................. | G06F 13/1673 |

* cited by examiner

*Primary Examiner* — Henry Tsai
*Assistant Examiner* — Christopher A Daley
(74) *Attorney, Agent, or Firm* — NIXON & VANDERHYE P.C.

(57) ABSTRACT

An apparatus has first-in, first-out buffer circuitry to transfer data from a source domain to a sink domain across a clock domain boundary. The FIFO buffer circuitry has data transfer circuitry; source domain and sink domain data transfer control circuitry to maintain state vectors indicative of a state of the FIFO buffer circuitry in the respective domain; and synchronisation circuitry in each of the source domain and the sink domain to stabilise a signal received from the other of the source domain and the sink domain and to store the received state vector. The synchronisation circuitry is clock-gated by an enable signal and the synchronisation circuitry is responsive to a change in the state of the FIFO buffer circuitry in the respective domain to advance the respective state vector by controlling the enable signal to enable output of elements of the received state vector.

20 Claims, 19 Drawing Sheets

| Encoding | Source state: next reg. to be written | Sink state: next reg. to be read from |
|---|---|---|
| 0000 | 0 | 0 |
| 0001 | 1 | 1 |
| 0011 | 2 | 2 |
| 0111 | 3 | 3 |
| 1111 | 0 | 0 |
| 1110 | 1 | 1 |
| 1100 | 2 | 2 |
| 1000 | 3 | 3 |

FIRST-IN, FIRST-OUT BUFFER

BACKGROUND

The present technique relates to the field of data processing. More particularly, the present technique relates to a first-in, first-out buffer.

First-in, first-out (FIFO) buffers are used to transfer data across clock-domain boundaries. Where different parts (or domains) of a processing apparatus operate in response to different clock signals having potentially different clock frequencies, a clock boundary will occur between these clock domains. To transfer data between clock domains, a FIFO buffer may be used to provide a form of synchronisation between the asynchronously operating domains. However, providing such FIFO buffers can pose challenges due to their placement and route flow to enable their operation. Some processing apparatuses (such as CPUs and GPUs) need to transfer very large amounts of data across clock domains and so FIFO buffers providing a large bandwidth of data may need to be provided, further exacerbating the challenges in placing the FIFO buffers. This may be the case particularly where the FIFO buffer has to cross a clock domain boundary as well as a voltage boundary.

SUMMARY

In one example arrangement, there is provided an apparatus comprising: first-in, first-out (FIFO) buffer circuitry to transfer data from a source domain to a sink domain across a clock domain boundary, the FIFO buffer circuitry comprising: data transfer circuitry comprising one or more data storage elements to store the data to be transferred across the clock domain boundary; source domain data transfer control circuitry to maintain a source state vector indicative of a state of the FIFO buffer circuitry in the source domain and sink domain data transfer control circuitry to maintain a sink state vector indicative of a state of the FIFO buffer circuitry in the sink domain; synchronisation circuitry in each of the source domain and the sink domain to stabilise a signal indicative of a received state vector received from the other of the source domain and the sink domain and to store the received state vector; wherein for at least one of the source domain and the sink domain: the respective synchronisation circuitry is clock-gated by an enable signal; and the respective synchronisation circuitry is responsive to a change in the state of the FIFO buffer circuitry in the respective domain to advance the respective state vector by controlling the enable signal to enable output of one or more elements of the received state vector.

In another example arrangement, there is provided a method of transferring data from a source domain to a sink domain across a clock boundary using first-in, first-out (FIFO) buffer circuitry, the method comprising: storing the data to be transferred across the clock domain boundary using one or more data storage elements; maintaining a source state vector indicative of a state of the FIFO buffer circuitry in the source domain and a sink state vector indicative of a state of the FIFO buffer circuitry in the sink domain; stabilising, using synchronisation circuitry in each of the source domain and the sink domain, a signal indicative of a received state vector received from the other of the source domain and the sink domain; storing, using the synchronisation circuitry, the received state vector, wherein for at least one of the source domain and the sink domain, the respective synchronisation circuitry is clock-gated by an enable signal; and for at least one of the source domain and the sink domain: advancing, in response to a change in the state of the FIFO buffer circuitry in the respective domain, the respective state vector by controlling the enable signal to enable output of one or more elements of the received state vector.

In a yet further example arrangement, there is provided a non-transitory computer-readable medium to store computer-readable code for fabrication of an apparatus comprising: first-in, first-out (FIFO) buffer circuitry to transfer data from a source domain to a sink domain across a clock domain boundary, the FIFO buffer circuitry comprising: data transfer circuitry comprising one or more data storage elements to store the data to be transferred across the clock domain boundary; source domain data transfer control circuitry to maintain a source state vector indicative of a state of the FIFO buffer circuitry in the source domain and sink domain data transfer control circuitry to maintain a sink state vector indicative of a state of the FIFO buffer circuitry in the sink domain; synchronisation circuitry in each of the source domain and the sink domain to stabilise a signal indicative of a received state vector received from the other of the source domain and the sink domain and to store the received state vector; wherein for at least one of the source domain and the sink domain: the respective synchronisation circuitry is clock-gated by an enable signal; and the respective synchronisation circuitry is responsive to a change in the state of the FIFO buffer circuitry in the respective domain to advance the respective state vector by controlling the enable signal to enable output of one or more elements of the received state vector.

BRIEF DESCRIPTION OF THE DRAWINGS

Further aspects, features, and advantages of the present technique will be apparent from the following description of examples, which is to be read in conjunction with the accompanying drawings, in which.

DESCRIPTION OF EXAMPLES

Figure 1:
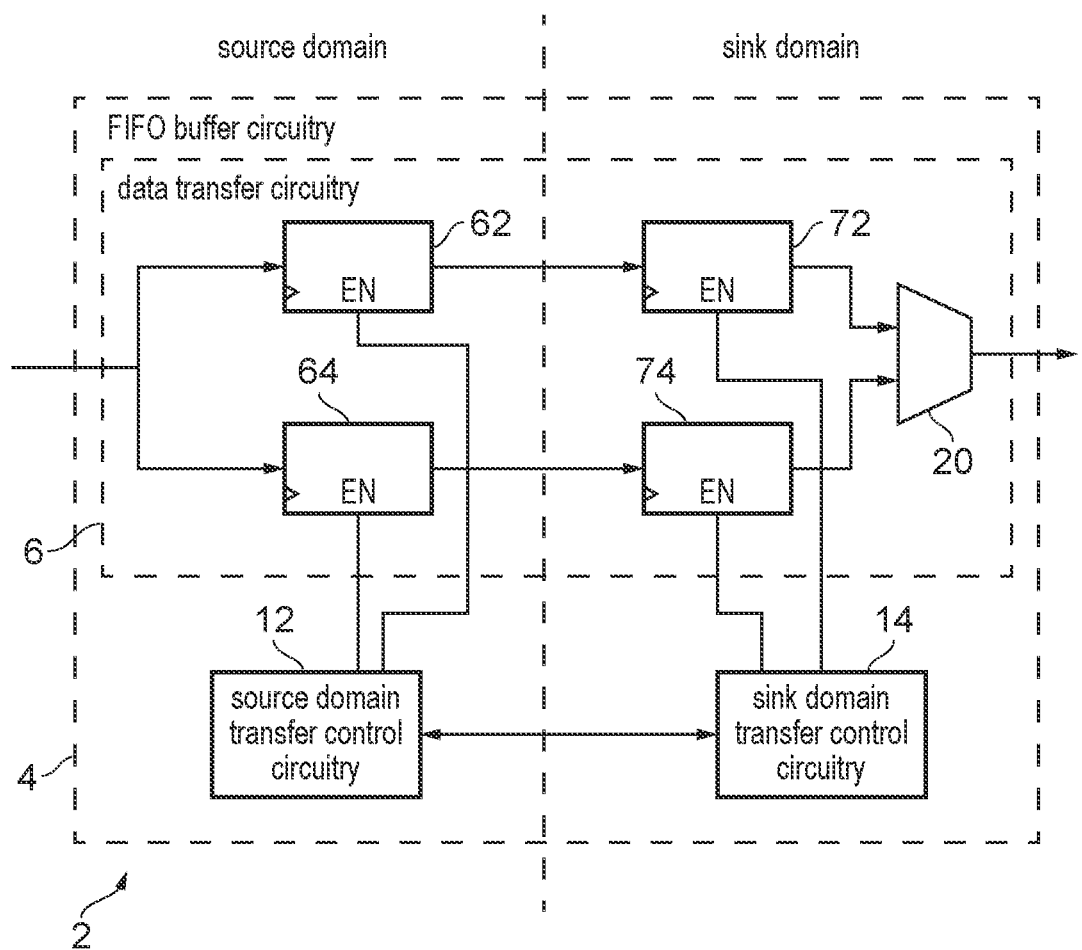
FIG. 1 is a schematic illustration of an apparatus implementing the first technique described herein.

Before discussing example implementations of the techniques described herein with reference to the accompanying figures, the following description of the present techniques is provided.

In accordance with the techniques described herein, there is provided first-in, first-out buffer circuitry to transfer data from a source domain to a sink domain across a clock domain boundary. The source domain and the sink domain each represent a clock domain, with the components in each domain synchronised by respective clock signals. Since the components in the source domain and the sink domain operate in response to different clock signals, components in the respective domains do not necessarily operate with the same timing or even at the same frequency as each other. This leads to challenges in transferring data between the clock domains as it cannot be relied upon that data made available on the source side on one clock cycle will have been read into the sink side in the next cycle. Consequently a FIFO buffer is used which provides a feedback loop to control the transfer of data between the asynchronously operating domains.

As used herein, the term source domain refers to a clock domain containing a data source that is to transfer data to one or more components in the sink domain, where the sink domain is a separate clock domain (and in some examples also a separate voltage domain).

To support the transfer of data across the clock domain boundary, the apparatus has FIFO buffer circuitry comprising data transfer circuitry. The data transfer circuitry has data storage elements (e.g., registers) to store the data that is to be transferred across the clock domain boundary. These data storage elements are populated by the FIFO buffer circuitry in the source domain and so operate in the source domain according to a source clock. Additional data storage elements may be provided in the sink domain in which the data transferred across the clock boundary can be stored.

The FIFO buffer circuitry is also provided with transfer control circuitry in each of the source domain and the sink domain to maintain respective source and sink state vectors indicative of a state of the FIFO buffer circuitry in each domain. These state vectors are used to track which data storage elements contain data items provided by the source domain that are ready to be read into the sink domain and which data storage elements contain data items that have already been read into the sink domain and so can be updated with new data to be transferred. By maintaining the state vectors in each of the source domain and the sink domain and communicating these state vectors between domains, the FIFO buffer circuitry is able to operate asynchronously to transfer data across the clock domain boundary reliably. Using these state vectors, the source domain is able to signal to the sink domain when the data storage elements have been populated with data that can be transferred into the sink domain and the sink domain is able to signal to the source domain when the sink domain has read that data, at which point the source domain can repopulate the data storage elements with any further data to be transferred.

The FIFO buffer circuitry operates according to a first-in, first-out arrangement so the order in which the data is provided to the FIFO buffer circuitry is the same order in which the data will be read out from the FIFO buffer circuitry. This therefore imposes that a known (and most commonly a fixed) order be used for updating and reading from the data storage elements.

The performance of a FIFO buffer can be measured by its bandwidth—the rate at which data can be transferred through the FIFO buffer. FIFO buffers are typically only able to transfer a maximum of one data item across the clock domain boundary at a time (i.e., in a single cycle of the source or sink domains). However, in accordance with a first technique described herein, there is provided an apparatus having FIFO buffer circuitry that is able to perform a multi-item transfer to transfer two or more data items in a single clock cycle of a respective domain. This therefore enables the bandwidth of the FIFO buffer to be increased as compared to a FIFO buffer having the same depth that does not support multi-item transfer when multiple data items are available to the FIFO buffer at the same time. Additionally, or alternatively, the size of the FIFO buffer (the number of data storage elements of the FIFO buffer) can be reduced, saving power and area.

To enable this multi-item transfer, the FIFO buffer circuitry has two or more data storage elements to store the two or more data items to be transferred in the single cycle.

The multi-item transfer functionality may be provided only on the source side, only on the sink side, or on both of the source side and sink side. Where this functionality is provided in the source domain, the source domain transfer control circuitry is operable to perform the multi-item transfer by transferring two or more data items into data storage elements in a single clock cycle of the source domain. To reflect this update of two or more data storage elements, the source domain transfer control circuitry then advances the source state vector by two or more state vector encodings (where the number of state vector encodings by which the state vector is advanced matches the number of data items transferred). Each state vector encoding represents a possible state of the FIFO buffer circuitry, with the state vector encodings having a known (and typically fixed) order through which they are iterated. Thus, by advancing the source state vector by the two or more encodings, the source domain transfer control circuitry can indicate that the state of the FIFO buffer circuitry has been updated by two or more successive states. In this way, two or more data items can be written into the data storage elements of the data transfer circuitry in a single cycle.

Additionally, or alternatively, the sink side of the FIFO buffer circuitry may be provided with the functionality to carry out the multi-item transfer. In such examples, the sink domain transfer control circuitry may read two or more data items from respective data storage elements in a single cycle of the sink domain. To reflect the fact that these two data storage elements have been read, the sink domain transfer control circuitry then advances the sink state vector by two or more state vector encodings in the single clock cycle.

This technique may be implemented for each clock domain individually so that, for example, the source domain transfer control circuitry can initiate the multi-tem transfer by placing two or more data items into the data storage elements in a single source clock cycle and advancing the source state vector by the two or more encodings. The sink domain transfer control circuitry may then be responsive to detecting the update in the source state vector by the two or more encodings to cause the two or more data items to be read into the sink domain from the data storage elements in a single sink clock cycle and advance the source state vector by the two or more encodings to indicate that those two or more data items have been transferred. In this way, the two or more data items can be transferred through the FIFO buffer more quickly, thereby enabling a higher bandwidth to be supported and/or enabling fewer data storage elements to be used.

In some examples however, this technique may be applied on only one side of the clock boundary. For example, the source domain transfer control circuitry may be arranged to perform the multi-item transfer but the sink domain transfer control circuitry may not be. In such an example, the sink domain, in response to detecting an update of the state vector by the two or more encodings, may read out the data items on different (e.g., successive) clock cycles of the sink domain. This approach may be used for example where one clock domain operates at a higher clock frequency than the other. If the sink domain operates at a clock frequency twice that of the source domain, the sink domain may already have the bandwidth to read out two data items in a single source clock cycle, albeit in two sink clock cycles. As such, this technique could be applied only in a clock domain having the lower clock frequency.

As described herein, the source and/or sink domain transfer control circuitry are operable to carry out the multi-item transfer and so may selectively employ such an approach. When not carrying out multi-item transfers, the respective transfer control circuitry may perform single-item transfers in which only a single data item is transferred into or read from the data storage elements in a single clock cycle.

Flip flops (and other circuitry components) have timing constraints (e.g., setup-up time and hold time), which mandate that the incoming data signal must not change close to an active clock-edge. If those constraints are not met, then metastability can occur in the flip flop (or other component) such that the timing of the flip flop output cannot be relied on. Since the source domain and sink domain are not synchronised by the same clock signal, the behaviour of the components (such as flip flops) handling signals received from the other domain may in some cases violate the timing constraints leading to this metastability. Synchronisation circuitry is provided to mitigate this issue by reducing the probability of metastability occurring to very low levels which are deemed acceptable. Despite this, some metastability in signals crossing the clock domain boundary will still remain. As such, where a signal indicative of a state vector is received in one domain from the other domain, some uncertainty may be introduced as to when the update to the state vector made in one domain will be observed in the other domain. In some cases where the state vector has more than one element (e.g., comprises several bits), if more than one bit of the state vector is updated in a single clock cycle of one of the domains, due to the unpredictability in signals crossing the clock domain boundary, the update to the different bits of the state vector may be observed in the other domain on different clock cycles. To avoid an incorrect state vector being observed in the other domain, a state vector encoding may be used for which each successive state differs by a change in only one element of the state vector (e.g., one bit changes to represent one data item being transferred into or read out from a data storage element). Thus, for successive states, only a single element will be updated and so the update to that element will either be observed or not observed, but a partial update can be avoided.

However, where a multi-item transfer has taken place, the state vector encoding to represent the new state will differ by a change in two elements. This could therefore cause the incorrect state to be observed when the update to the state vector is signalled across the clock domain boundary.

Where such a multi-item transfer has taken place in a first domain and the update to the state vector is signalled across the clock domain boundary to indicate to the second domain that the multi-item transfer has taken place, there are several possibilities for the update to the state vector that could be observed.

Firstly, no update to the state vector could be observed in the second domain if the update to the two or more elements of the state vector has not propagated at all. In this case, the second domain would detect no change in the state vector which is a valid state.

Secondly, if all of the elements of the state vector that were updated by the first domain are observed as updated in the second domain, this will represent a valid state indicating that all of data items involved in the multi-item transfer have been transferred.

Thirdly, the second domain could observe only some of the elements of the state vector as having been updated. This may itself be a valid state that the second domain may not be able to distinguish from a validly signalled state. As long as this state represents an intermediate state between the original encoding of the state vector in the first domain and the updated encoding of the state vector in the second domain, it is safe for the second domain to act on this intermediate state. However, if the valid but incorrectly observed state is not an intermediate state, then if the second domain interprets this state as a valid state and acts on it, this could lead to incorrect behaviour where the source domain overwrites a data storage element that has not yet been read by the sink domain, for example. As such, an encoding may be used for the state vectors whereby any incorrectly observed but valid states arising from only some updates to elements (e.g., bits) of the state vector being signalled are intermediate states between the original encoding and the updated encoding that was to be signalled or can otherwise be ruled out as the state being signalled (e.g., because the observed state value cannot be reached while the observing clock domain is in its current state). Such an encoding and its interpretation is discussed in more detail below and with reference to FIGS. 7 and 8.

Fourthly, the second domain could observe only some of the elements of the state vector as having been updated but in such a way that the observed state vector represents an invalid state. The observed state encoding may be invalid where it does not correspond to a state where the data storage elements are updated in a fixed order (e.g., the invalid state suggests that a data storage element has been updated out of order). Thus, where an element of the state vector corresponding to a next data storage element is observed as being unmodified but at least one other element is modified, the second domain observing this invalid state vector may disregard the invalid state vector. This may be done on the basis that the state vector is invalid but is likely to be further updated to a valid state vector once a modification to one or more other elements are observed.

On the other hand, the second domain may in some examples interpret the invalid state vector encoding as if it were a state vector encoding with the element corresponding to the next data storage element modified. In this way, the second domain may in effect recognise that the modification to the next element to be updated is missing but that the invalid state vector observed could only have been reached where the first domain's state vector had been updated such that both the next element to be updated and the one or more elements that were observed as being updated in the second domain were modified. This approach may be taken where a state vector encoding is used that allows such a conclusion to be validly drawn. Again, such an encoding and its interpretation is discussed in more detail below and with reference to FIGS. 7 and 8. By interpreting the invalid state vector in this way, the latency of signalling the update in the state vector can be reduced in situations where such an invalid state vector is observed, thereby increasing the bandwidth of the FIFO buffer.

In addition to the number of data items that can be transferred into data storage elements in a single clock cycle, another limiting factor affecting the bandwidth of a FIFO buffer is the amount of time taken for synchronisation circuitry to signal updates in the state of the FIFO buffer on the respective sides of the clock domain. Of particular relevance is the round-trip time taken for a signal from the source domain indicating that another data storage element has been updated with a data item ready to be read into the sink domain to reach the sink domain, for the sink domain to read that data item and indicate to the source domain that the data element has been read and can be updated, and for this indication to be received in the source domain.

According to a second technique described herein, there is provided an apparatus with an arrangement of synchronisation circuitry to reduce the latency in transferring state vectors between the clock domains and hence reduce this round trip time.

As described herein, there is provided the apparatus having FIFO buffer circuitry, source domain transfer control circuitry and sink domain transfer control circuitry as described above, with synchronisation circuitry in each of the source domain and the sink domain to stabilise a signal indicative of a received state vector received from the other of the source domain and the sink domain. This synchronisation circuitry is provided to address the unpredictability as to how components in a receiving domain will respond to changes in their inputs effected by another domain. Since these changes will not be performed with a timing based on the receiving domain's clock, the changes may occur outside of defined timing ranges for components to provide well-defined behaviour and instead may exhibit metastable behaviour. The synchronisation circuitry acts to stabilise the received signals so that they can be processed in the receiving domain. In some examples, the synchronisation circuitry comprises two or more data storage elements (e.g., registers or flip-flops) arranged in series.

The synchronisation circuitry in at least one of the source domain and the sink domain is then clock-gated such that the output or input to the synchronisation circuitry can be controlled using an enable signal. The output of the synchronisation circuitry in each domain is then provided to the other domain. These signals are used to represent the state vectors such that the signal received in the sink domain is indicative of the state in the source domain and the signal received from the synchronisation circuitry in the source domain is indicative of the state in the sink domain.

Clock-gating is used to control when these signals are allowed to be updated in the synchronisation circuitry and consequently when the state vector being indicated to the other domain will be updated. Clock-gating allows the clock signal to a component to be temporarily disabled with the effect being that the synchronisation circuitry will not update its state. While clock-gating is typically used in processors to disable components that are not in use in order to save power, in this case, somewhat unconventionally, clock-gating is used to control when the synchronisation circuitry is updated and consequently when the state vector to the other domain is updated. Where the state vector comprises more than one element (e.g., where more than one data storage element is provided), rather than the entire synchronisation circuitry being clock-gated together, the enable signal is able to specify which element or elements (e.g., which bit(s)) of the synchronisation circuitry is to be enabled or disabled such that the individual elements of the state vector in the synchronisation circuitry can be separately updated/provided to the other domain. Thus, the enable signal may have a number of bits equal to the number of elements of the state vector (each element of which may comprise a single bit).

To advance the respective state vector in a domain implementing this technique, the enable signal is used to enable the last stage of the synchronisation circuitry (the synchronisation circuitry storing the received state vector from the other domain). Where multiple data storage elements are provided in the data transfer circuitry, the state vectors may comprise an element for each data storage element. In such cases, the enable signal may enable output of the elements of the state vector corresponding to the data storage elements for which an update in their state has occurred.

The enable signal may be controlled by data transfer control circuitry such that to advance a state vector in the domain of the data transfer control circuitry, the data transfer control circuitry provides an enable signal that enables output of one or more elements of the received state vector from the other domain that correspond to one or more data storage elements for which a change in state is to be signalled.

With the element(s) of the synchronisation circuitry enabled in this way, any updates to the state vector that were previously received form the other domain will be propagated through the synchronisation circuitry and back into the other domain where the propagation of this updated state vector can be used to signal that the change to the state of the FIFO buffer circuitry in the domain implementing this technique has occurred.

To enable toggling of the elements of the state vector signals (where toggling of an element may be used to indicate a change in the state of the data storage element corresponding to that element), inverter circuitry (e.g., an inverter or a bitwise inverter) may be positioned on the path between the source domain synchronisation circuitry and sink domain synchronisation circuitry or between the sink domain synchronisation circuitry and the source domain synchronisation circuitry. Thus, the synchronisation circuitry in the source domain, the synchronisation circuitry in the sink domain and the inverter may form a loop.

A worked example illustrating the operation of such an apparatus is described below with reference to FIGS. 5A-5G.

This second technique may be implemented on both sides of the clock domain such that the synchronisation circuitry in both of the source domain and the sink domain is clock-gated by an enable signal or may be implemented in only one of the source and sink domains with another arrangement of synchronisation circuitry provided in the other domain.

Where the second technique is implemented, rather than waiting until a particular state has already been reached in a first clock domain to enable the relevant element of the synchronisation circuitry to update the state vector, the transfer control circuitry in the first clock domain is arranged to enable the output of the elements of the received state vector (using the enable signal) a cycle in advance of the data actually being read into or out from the data storage element in the first clock domain. This can further reduce the latency involved in the communications to synchronise the clock domains and since it is known that the data will be read in or out on the next clock cycle, it is usually safe to update the state vector in this way since the read from or transfer into the data storage element will occur before the second domain has been able to respond to the updated state vector and transfer new data into or read not yet updated data from the data storage element.

However, where the second clock domain receiving the updated state vector from the synchronisation circuitry of the first clock domain operates with a clock frequency significantly greater than the clock frequency of the first clock domain, it is possible that the second clock domain could react to the updated state vector before the first clock domain has been able to read from/transfer data items into the relevant storage element(s). This could lead to the wrong data being transferred across the FIFO buffer and/or data being missed. As such, the present technique may be applied only in the case where the clock frequencies in the source and sink domains differ by less than a predetermined timing factor. Where the synchronisation circuitry comprises two data registers, this timing factor is a factor of two such that the clock frequencies of the two domains cannot differ by more than a factor of two. To alleviate this timing requirement, more synchronisation elements may be provided to ensure proper transfer of data even where there is a large difference between the clock frequencies in the different domains. For example, if three registers are provided to implement the synchronisation circuitry, the timing factor would become a factor of three.

In some data processing apparatuses, the frequency of the clocks may be programmable such that the clock frequencies, and as a result the ratio of clock frequencies, in the source and sink domains is not fixed. In such examples or otherwise, the FIFO buffer circuitry may comprise an alternative synchronisation mechanism with the FIFO buffer circuitry configured to switch to the alternative synchronisation mechanism when it is detected that a difference between the clock frequency in the source domain and the sink domain differs by more than the predetermined timing factor.

Although providing more the synchronisation circuitry with more registers alleviates the constraint on the relative frequencies of the two domains, the timing factor is still present and so the relative frequencies are still constrained. According to another approach to mitigating this constraint on the relative frequencies of the clock domains, the data to be transferred can be double-buffered. This approach removes the constraint on the relative frequencies of the two domains and allows the data items to be transferred on the same cycle as the synchronisation circuitry is updated to represent that data transfer (rather than updating the synchronisation circuitry on the cycle before performing the data transfer).

To implement this approach on the sink side so as to enable the sink side clock to operate at much higher frequencies than the source side clock, each data storage element on the source side may be replaced by two data storage elements operating in parallel with a multiplexer provided to select between the two registers. When transferring a data item, the synchronisation circuitry could then be updated (using the enable signal) on the same cycle as the data item is read into one of the two data storage elements (rather than waiting until the next cycle). The multiplexer could then be used to select which of the data storage elements should be visible on the sink side such that the sink side reads the data item that was read into one of the data storage elements. If another data item is received on the next clock cycle, this can be placed into the other data storage element.

To implement this approach on the sink side so as to enable the source clock to run significantly faster than the sink clock, two data storage elements may be arranged in series in the sink domain to receive the data from data storage element(s) in the source domain. The first of the data storage elements is constantly enabled while the second data storage element is controlled by the sink domain transfer control circuitry. With this additional data storage element, data can be read into the sink domain on the same cycle as the synchronisation register is updated to indicate the state in which the data item has been read. As a result, even where the source clock has a significantly higher frequency than the sink clock, the apparatus is able to operate correctly.

This approach, whether implemented on the source side or the sink side removes the constraint on the relative frequencies of the clock domains (rather than just increasing the timing factor).

Although the above first and second techniques have been discussed separately, in some examples, both of these techniques are implemented in a single apparatus.

In the apparatuses according to either of the first and second techniques, or making use of both techniques, the state vectors maintained by the source domain transfer control circuitry and the sink domain transfer control circuitry use an encoding having the following properties.

Firstly, each element (e.g., each bit) of the state vector encoding represents a state of a corresponding data storage element.

Secondly, successive state vector encodings corresponding to successive states of the FIFO buffer circuitry differ by a change in only one element of the state vector encoding. This means that for each successive state, only a single element of the state vector has to be updated with only a single update signalled to the other domain. This therefore reduces the likelihood of errors occurring where only some updated bits of an updated state vector are received when the updated state vector is received in another domain. Stated another way, the state vector encodings for successive states of the FIFO buffer circuitry have a Hamming distance of one.

As referred to herein, successive states are states of the FIFO buffer circuitry in the source domain where one additional data item has been provided to the data storage elements and in the sink domain where one additional data item has been read from the data storage elements.

Thirdly, the order in which each element in the state vector encoding is updated to indicate successive states of the FIFO buffer circuitry is fixed. Since the data storage elements are updated in a known order, it is therefore known which element of the state vector will be the next to be updated.

Figures 7, 8:
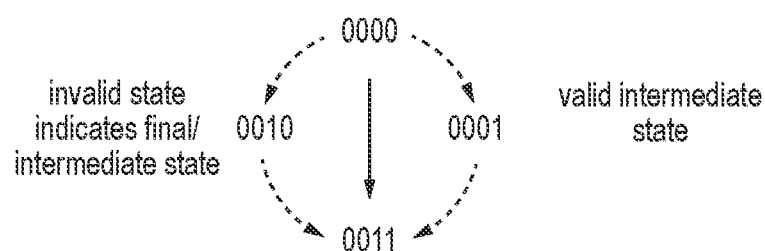
FIG. 7 is a table illustrating an example state vector encoding.
FIG. 8 illustrates possible state vector encodings that could be observed when updating a state vector by more than one state vector encoding in a single clock cycle.

An example encoding having this form, for a FIFO buffer having four data storage elements 0-3 is shown in FIG. 7.

This encoding may be employed in FIFO buffers having a number of storage elements of one or more; however, in some examples the data transfer circuitry comprises at least three data storage elements and the source and sink state vectors each comprise at least three elements. In some examples, the data transfer circuitry comprises at least four storage elements and the source state vector and the sink state vector each comprise at least four elements.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 is a schematic illustration of an apparatus 2 implementing the first technique described herein. The apparatus 2 has components operating in two separate clock domains: a source domain and a sink domain. The components in each domain are clocked (as indicated with the triangular symbol in the data storage elements 62, 64, 72, 74) and operate in response to respective clock signals used to synchronise the components in the respective domains. The components in the source domain operate in response to a source clock signal and the components in the sink domain operate in response to a sink clock signal. The source and sink domain clock signals are not synchronised with each other and so the components in the respective domains can be said to operate asynchronously. This asynchronous operation can complicate the process of transferring data. Unlike synchronously operating components for which data can be transferred by connecting components in series, when components in the source domain make data available to components in the sink domain, it is not be known when that data has been read in the sink domain such that it is safe to update that data on the source side.

To provide a mechanism to safely transfer data from the source domain to the sink domain, FIFO buffer circuitry 4 is provided. The FIFO buffer circuitry 4 has data transfer circuitry 6 to carry out the transfer of data and transfer control circuitry 12, 14 in each of the source domain and the sink domain to synchronise the operations of the FIFO buffer circuitry 4 in the respective domains.

The data transfer circuitry 6 comprises data storage elements 62, 64 (e.g., registers) in the source domain into which data items to be transferred to the sink domain can be transferred and data storage elements 72, 74 in the sink domain into which data items can be transferred from the source domain data storage elements 62, 64 to effect the transfer into the sink domain. A multiplexer 20 is provided to select from the sink domain data storage elements 72, 74 and provide the data items transferred through the FIFO buffer circuitry 4 to downstream components making use of those data items. In some examples, the data storage elements may be arranged differently. For example the data storage elements 72, 74 may be replaced with a single data storage element downstream of the multiplexer 20.

To control the operation of the data storage elements 62, 64, 72, 74, each data storage element is clock-gated by an enable signal issued by the transfer control circuitry 12, 14 in the relevant clock domain. The enable signal is used to control when data can be read into the data storage elements such that when the enable signal is set, the data storage element will, on a next clock cycle of the relevant domain, read in any data that is provided at the input of the data storage element.

The source domain transfer control circuitry 12 and the sink domain transfer control circuitry 14 operate to control when data items are read into each of the data storage elements 62, 64, 72, 74 and synchronise this transfer of data so that, despite the clocks in the source domain and the sink domain operating asynchronously and with potentially different clock frequencies, data can nonetheless be transferred between the domains.

In accordance with the first technique described herein, the FIFO buffer circuitry 4 is operable to perform a multi-item transfer to transfer two data items into the source domain data storage elements 62, 64 in a single source domain clock cycle and/or two data items from the source domain data storage elements 62, 64 (into the sink domain data storage elements 72, 74) in a single sink domain clock cycle. The operation of this multi-item transfer will be discussed in more detail in relation to FIGS. 2A-2G.

As a first-in, first out (FIFO) buffer, the data transferred into the buffer is transferred out of the buffer in the same order as it was transferred in. In practice, this means that the order in which data storage elements 62, 64 are updated to store data to be transferred is the same order in which those data storage elements 62, 64 should be read from in the sink domain.

FIGS. 2A-2G illustrate a worked example of an apparatus 2 implementing the first technique described herein being used to carry out a multi-item transfer.

Figure 2A:
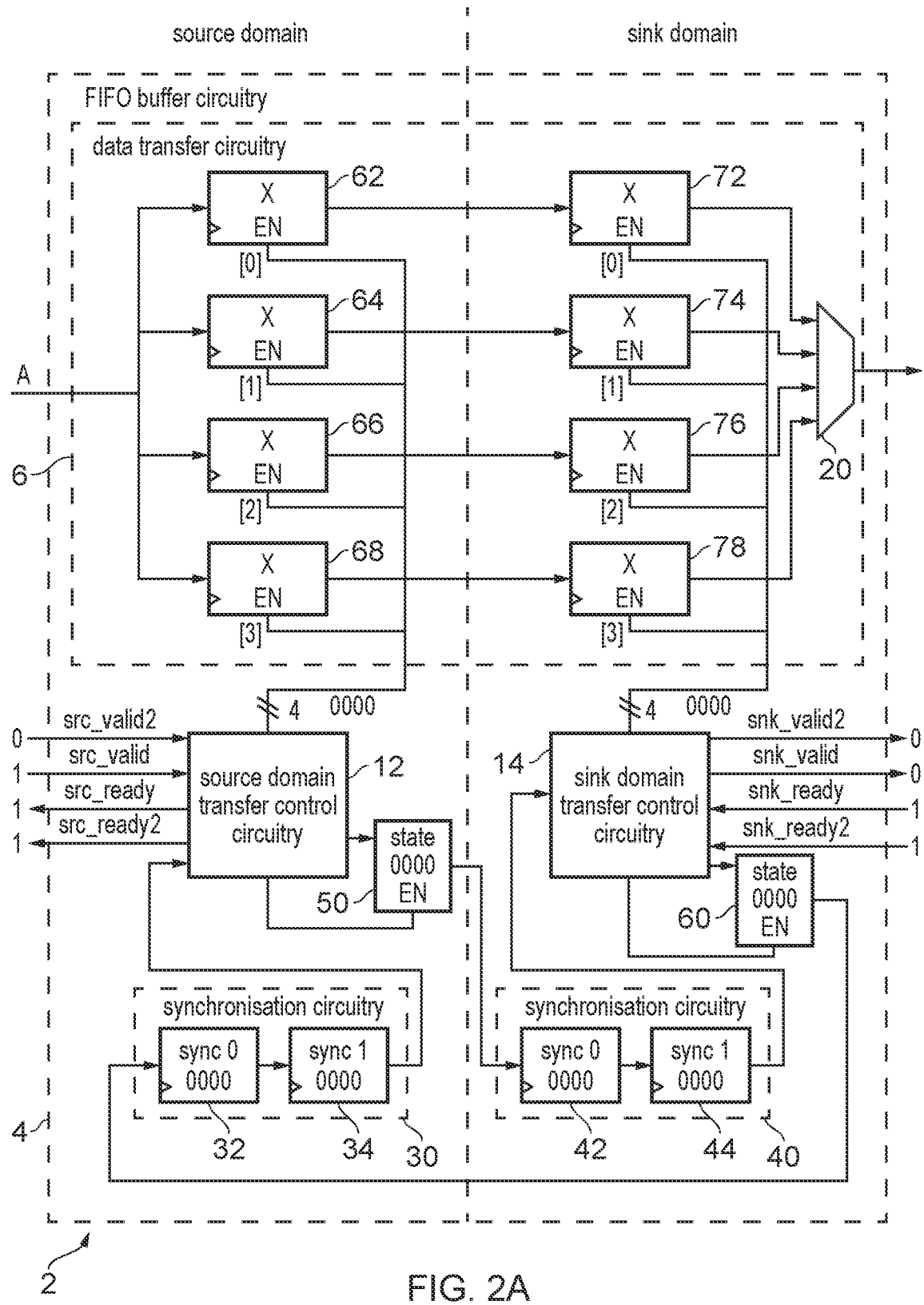
FIGS. 2A-2G illustrate a worked example of an apparatus that implements the first technique described herein being used to carry out a multi-item transfer.

FIG. 2A illustrates an apparatus 2 of a similar form to the apparatus shown in FIG. 1 although the apparatus 2 shown in FIG. 2A is provided with four data storage elements 62-68 in the source domain and four data storage elements 72-78 in the sink domain. The number of data storage elements in a FIFO buffer is referred to as the depth of the FIFO buffer, so the apparatus 2 of FIG. 2A has a depth of four.

As with the apparatus of FIG. 1, each data storage element in each of the source domain and the sink domain is clock-gated by a separate enable signal from the respective transfer control circuitry 12, 14 such that the operation of each data storage element can be independently controlled.

Each of the source domain transfer control circuitry 12 and the sink domain transfer control circuitry 14 is arranged to maintain a state vector in respective state vector storage elements 50, 60. The state vector is indicative of a current state of the FIFO buffer circuitry 4. In FIG. 2A, the state vector has a value of 0000. In the uninitialised state shown in FIG. 2A, each of the data storage elements 62-68, 72-78 is in an undefined state (represented by the value X). As such, none of the data storage elements 62-68 in the source domain contain data that is ready to be read by the sink domain and the next data storage element to be written to in the source domain is data storage element 62. This state is represented by the state vector 0000.

To indicate to the source domain transfer control circuitry 12 when upstream components are ready to provide data to the FIFO buffer circuitry 4, the source domain transfer circuitry 12 is provided with two src_valid signals that indicate whether the upstream components have either one data item ready to transfer or two or more data items ready to transfer. The source domain transfer control circuitry 12 in turn returns a src_ready and a src_ready2 to indicate when the FIFO buffer is ready to read in a data item in the next cycle and if so, whether the FIFO buffer is also ready to read in a second data item in the same cycle. Similarly, the sink domain transfer control circuitry 14 has a snk_ready flag and a snk_ready2 flag to allow downstream components to indicate when they are ready to receive data items on a next cycle, and snk_valid and snk_valid2 flags to allow the sink domain transfer control circuitry 14 to indicate when data is being transferred out from the FIFO buffer circuitry 4.

In FIG. 2A, the src_ready flag is set to 1 to indicate that the FIFO buffer circuitry 4 is ready to receive a data item to be transferred, the src_ready2 flag is set to 1 to indicate that two data items could be received if provided, the src_valid flag is set to 1 to indicate that a next data item is being provided by the upstream circuitry and the src_valid2 flag is set to 0 to indicate that a second data item is not being provided by the upstream circuitry.

In the sink domain, the snk_ready flag is set to 1 to indicate that the downstream circuitry is ready to receive a data item while the snk_valid and snk_valid2 signals are both set to 0 to indicate that no data items are yet ready to be transferred out from the FIFO buffer circuitry 4.

Also provided is synchronisation circuitry 30, 40 in each of the source and sink domains. The synchronisation circuitry 30, 40 receives a signal from the other domain indicative of the state vector in that other domain. Since the signal is received from a different clock domain, the synchronisation circuitry 30, 40 is provided to stabilise this signal as the variable timing (i.e., not in time with clock signal of the synchronisation circuitry) of the signals received from the other domain can lead to undefined behaviour of the receiving components. By providing the synchronisation circuitry 30, 40, the received signals can be stabilised to provide an indication of the received signal that can be used in the domain in which the signal has been received. As shown in FIG. 2A, the synchronisation circuitry 30, 40 in each domain comprises two data storage elements 32, 32, 42, 44 (e.g., registers) connected in series although other forms of synchronisation circuitry could be used (e.g., with more data storage elements connected in series or with a single synchronisation element).

Initially, the synchronisation elements 32, 34, 42, 44 all store a state vector of 0000 to indicate in the source domain that the next data storage element in which a data item will be stored is data storage element 62. In the sink domain, the state vector of 0000 indicates that that the next data storage element from which data will be read is data storage element 72. The state vectors matching indicates that there is no data stored in any of the data storage elements 62-68 in the source domain that is yet to be transferred to the sink domain.

FIGS. 2B-2G illustrate the same apparatus 2 and so the structural elements of those figures will not be described in detail again. FIGS. 2B-2G illustrate various data values present on successive cycles as the FIFO buffer circuitry 4 is used to transfer data across the clock boundary. In each figure, values that have been updated relative to the previous cycle are underlined. Each successive figure corresponds to an advance of one clock cycle in each of the clock domains; however, it will be appreciated that generally, the clocks of the source domain and sink domain need not advance in this way. It is for example possible for the sink domain clock to advance by two clock cycles in the time taken for the source domain clock to advance by one clock cycle. For simplicity of illustration however, the clocks are assumed in this example to advance at the same rate.

Figure 2B:
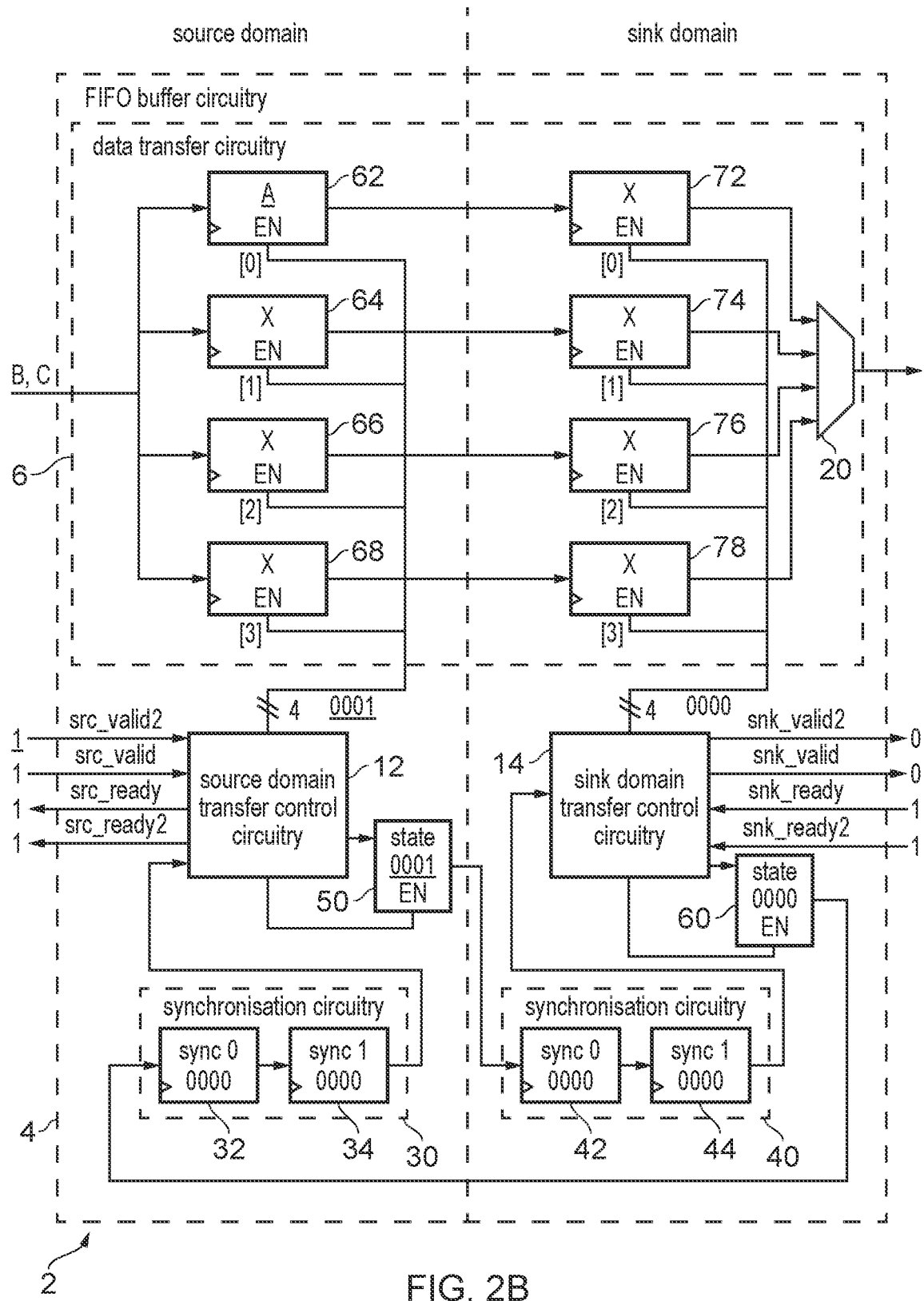

In FIG. 2B (corresponding to a state of the apparatus 2 on a cycle immediately following the cycle depicted in FIG. 2A), following the indication on the previous cycle that the FIFO buffer circuitry 4 is ready to receive a new data item, new data item A has been transferred into the data storage element 62 in response to the source domain transfer control circuitry 12 having set the enable bit for data storage element 62. A single item was transferred into the data storage elements 62-68 in this clock cycle and so this transfer represents a single-item transfer.

The state vector stored in state vector element 50 is also updated to a state vector encoding of 0001 to indicate that the next data storage element in which a data item will be stored is data storage element 64.

In this example, the src_valid 2 flag has also now been set to indicate that there are two data items ready to be transferred from the upstream components through the FIFO buffer circuitry 4.

Figure 2C:
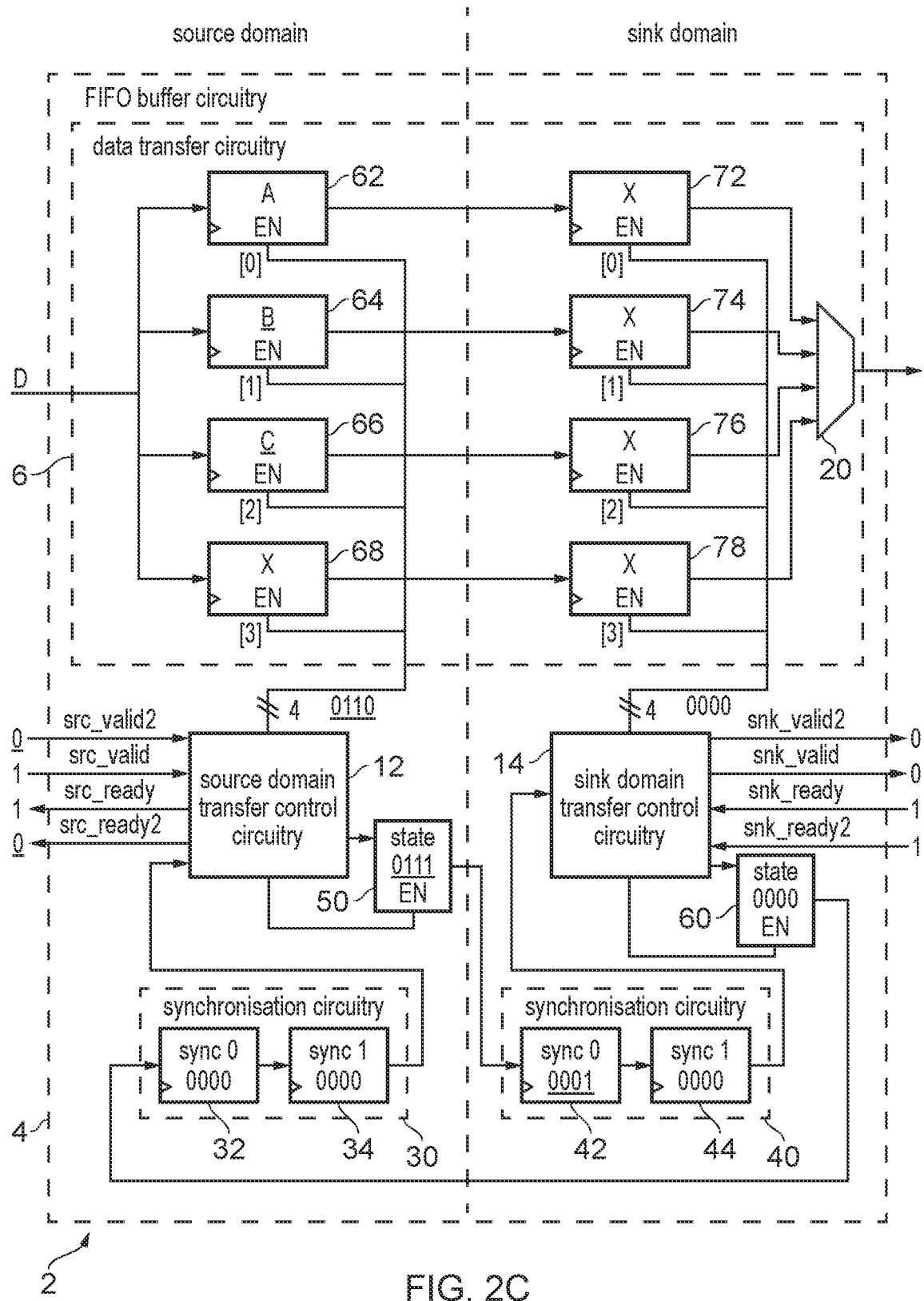

On the next clock cycle, as illustrated in FIG. 2C, the source domain transfer control circuitry 12 has responded to the indication from the upstream circuitry that two or more data items were ready to be transferred by initiating a multi-item transfer. Consequently, the source domain transfer control circuitry 12 has set the enable bits for data storage elements 64, 66, to allow data items B and C to be transferred into data storage elements 64, 66 respectively in the same clock cycle. In this way, a multi-item transfer can be carried out with more than one data item read into the data storage elements in a single clock cycle of the source domain.

To reflect this update, the state vector maintained by state vector storage element 50 is updated to the state vector encoding 0111 to indicate that the next data storage element to be updated is data storage element 68. Since the state of the FIFO buffer circuitry 4 has been advanced by two successive states (two new data items have been stored in the data storage elements), the state vector is thus updated by two state vector encodings. According to the encoding used in the apparatus 2, the next state vector encoding after 0001 would have been 0011, followed by 0111 and so the state vector has in this case been advanced by two state vector encodings. The particular form of encoding being used in this implementation will be discussed in more detail below in relation to FIGS. 7 and 8.

The state vector from the state vector storage element 50 on the previous cycle has now been propagated into to the sink domain such that the synchronisation element sync0 42 reflects the state vector encoding 0001. At this stage, the state vector in the synchronisation circuitry 40 is still being stabilised and so cannot be acted upon until it has reached the sync1 storage element 44.

Separately, the src_valid2 flag has been set to 0 to indicate that there are no longer two data items available from the upstream circuitry to be transferred through the FIFO buffer and the src_ready2 flag has been set to 0 to indicate that the FIFO buffer is not ready to handle two data items on the next cycle.

Figure 2D:
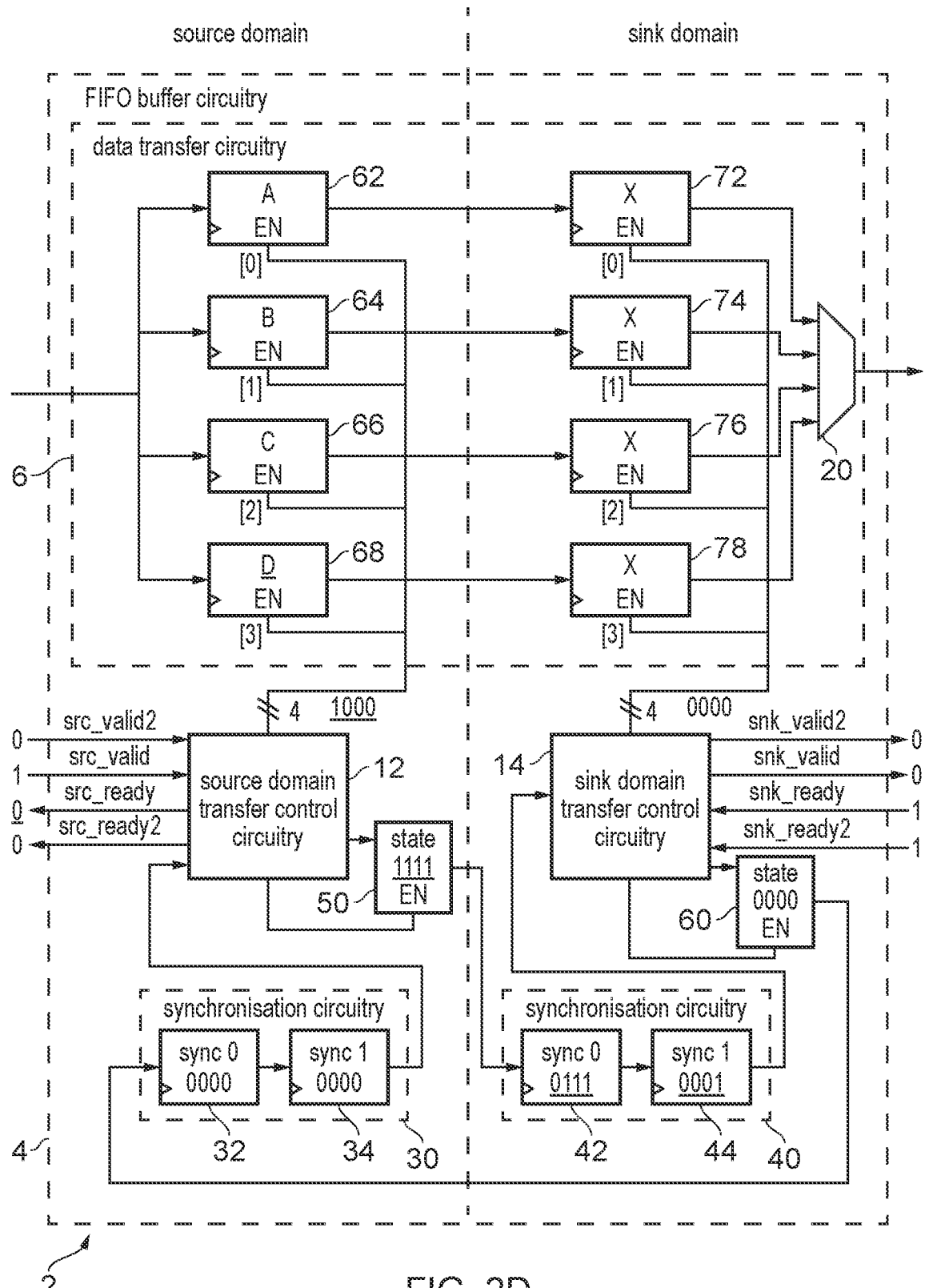

In the next cycle, as illustrated in FIG. 2D, the source domain transfer control circuitry 12 has set the enable signal for data storage element 68 to 1 to allow the new data item D to be read into the data storage element 68.

Consequently, the state vector maintained by state vector storage element 50 is updated to indicate that the next data storage element to be updated will be data storage element 62. However, since the source domain has not received any indication from the sink domain that the data already present in this storage element has been read into the sink domain, this data storage element cannot yet be updated. Accordingly, the source domain transfer control circuitry disables the src_ready flag to indicate to the upstream circuitry that the FIFO buffer circuitry 4 cannot accept another data item on the next clock cycle.

The state vector signal being transmitted to the sink domain has now propagated such that the sync1 storage element 44 stores the state vector encoding 0001 and the sync0 storage element 42 stores 0111.

Figure 2E:
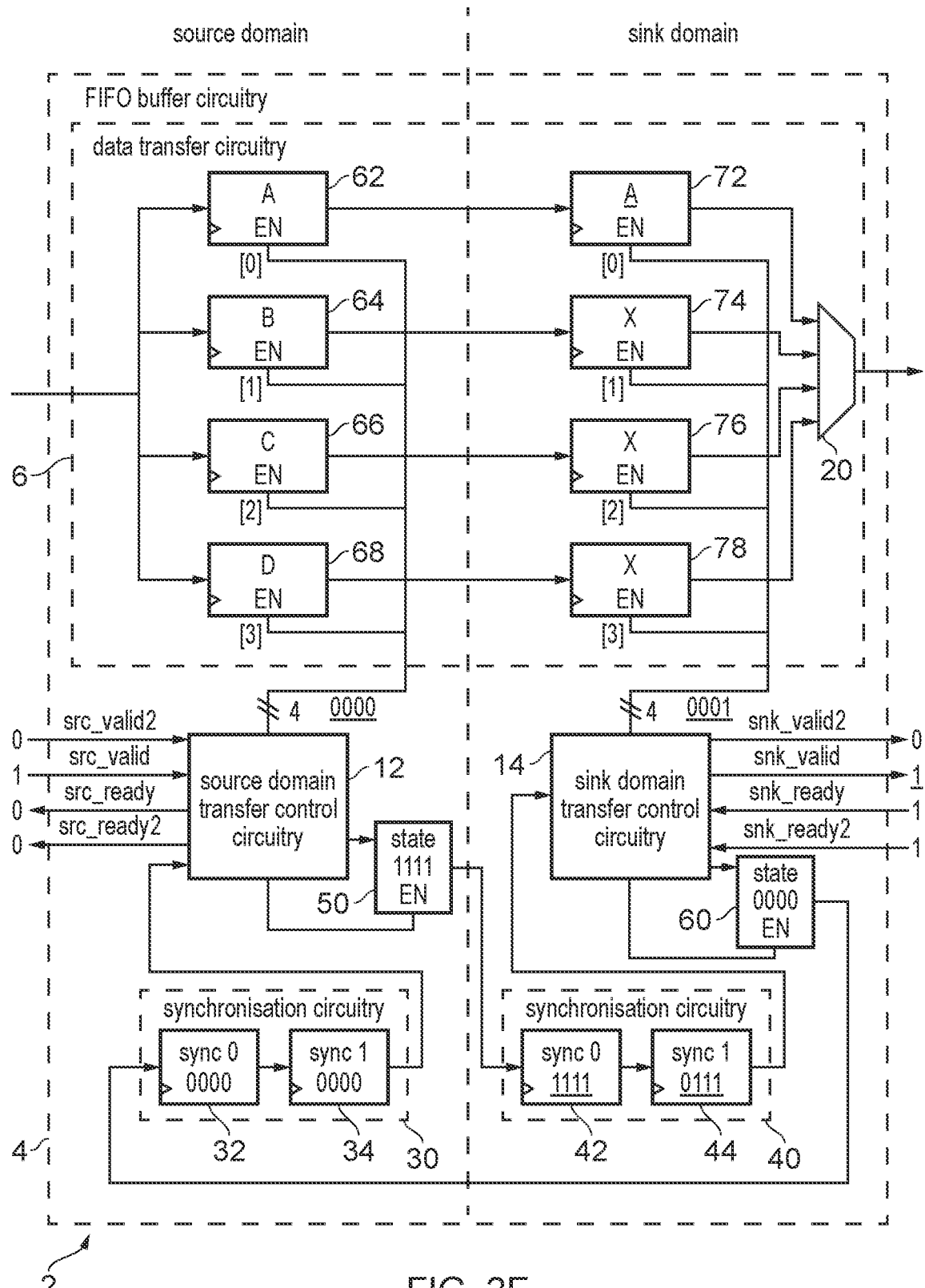

On the subsequent cycle, as depicted in FIG. 2E, the sink domain transfer control circuitry 14 can therefore act on the state vector encoding 0001 received from the source domain. This state vector encoding indicates to the sink domain that there is a data item stored in data storage element 62 that is ready to be read out on the sink domain side. The sink domain transfer control circuitry 14 therefore sets the enable bit for data storage element 72 to allow the data item A to be read into data storage element 72. The sink domain transfer control circuitry 14 then updates the state vector maintained in state vector storage element 60 to reflect this state. The state vector encoding 0001 on the sink domain side indicates that the next data storage element to be read from is data storage element 64. This state vector encoding, when this state vector encoding signalled to the source domain, will also indicate that the data storage element 62 has been successfully read from.

The sink domain transfer control circuitry 14 also indicates to the downstream components that a data item is ready to be read from the data storage element 72 by setting the snk_valid flag to 1. The data item A will consequently be read out from the FIFO buffer circuitry 4 on the next cycle, completing the transfer of that data item across the clock domain boundary.

Figure 2F:
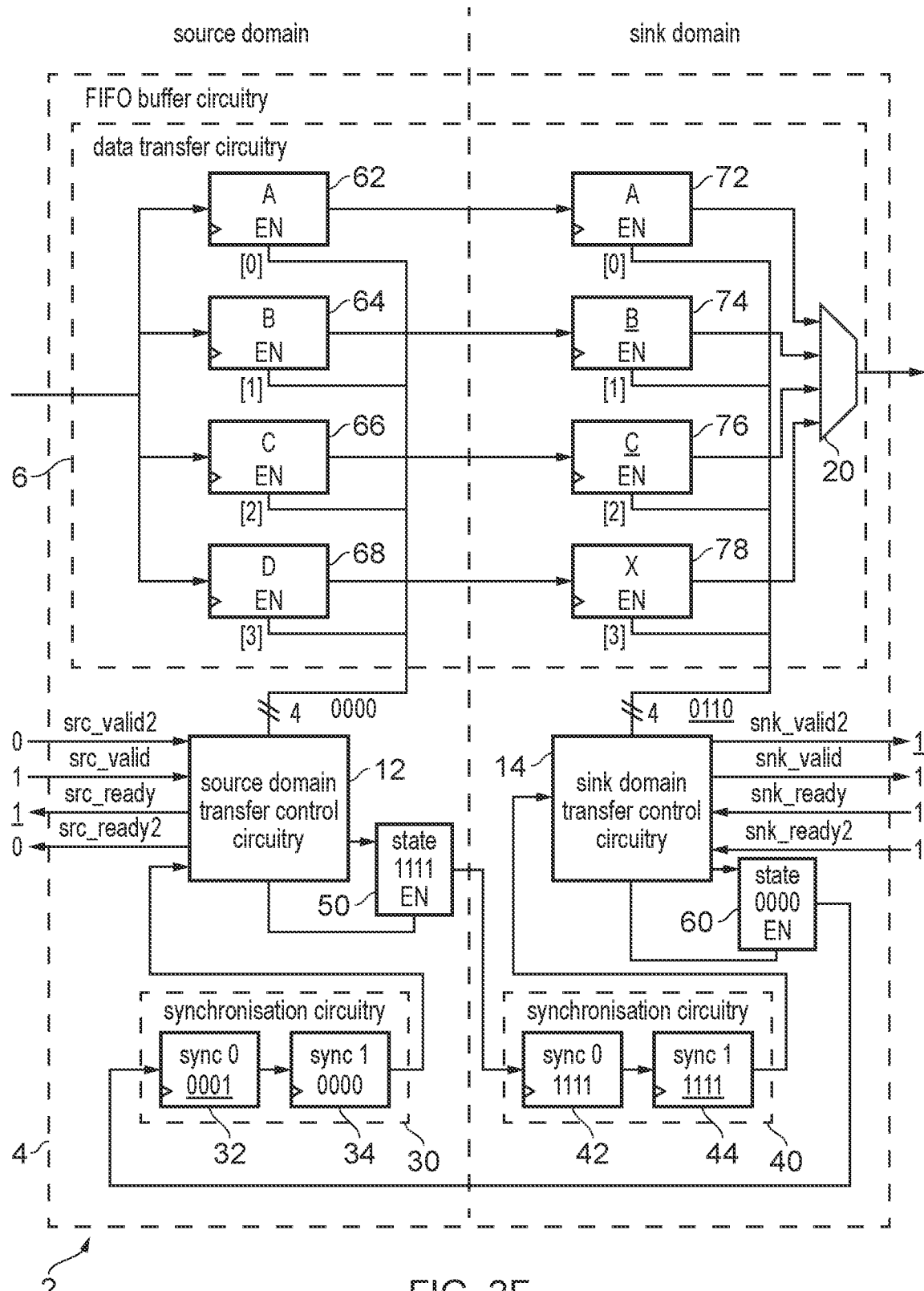

Turning to FIG. 2F which illustrates the next clock cycle, the sink domain transfer control circuitry 14 reads the propagated state vector encoding 0111 from the sync1 storage element 44 which indicates that the data storage elements 64, 66 have also been written to. In some examples, the sink domain is not able to perform a multi-item transfer in the sink domain and so recognising the update of the state vector by two vector encodings causes the data items to be read out on different cycles. In this example however, the FIFO buffer circuitry 4 in the sink domain is also operable to perform a multi-item transfer and so is able to read in two (or more) data items to the data storage elements 72-78 in a single sink domain clock cycle. The sink domain transfer control circuitry 14 then sets the enable signals for data storage elements 74 and 76 to 1 to cause the data items B and C to be read into those data storage elements 74, 76. The sink domain transfer control circuitry 14 also sets the snk_valid and snk_valid2 flags to 1 to indicate that two data items are ready to be read from the FIFO buffer circuitry 4 to allow these data items to be read out on the next cycle.

The state vector is updated to 0111 in the sink domain to indicate that the data storage elements 64, 66 have been read and the next data storage element to be read from is data storage element 68.

On this cycle, the previously updated state vector from the sink domain of 0001 has been propagated to the source side where it makes its way through the synchronisation circuitry 30. This signal has not yet propagated fully through the synchronisation circuitry 30 and so cannot yet be acted upon by the source domain transfer control circuitry 12 which at this cycle still has to indicate that it is not ready to receive any further data items.

Figure 2G:
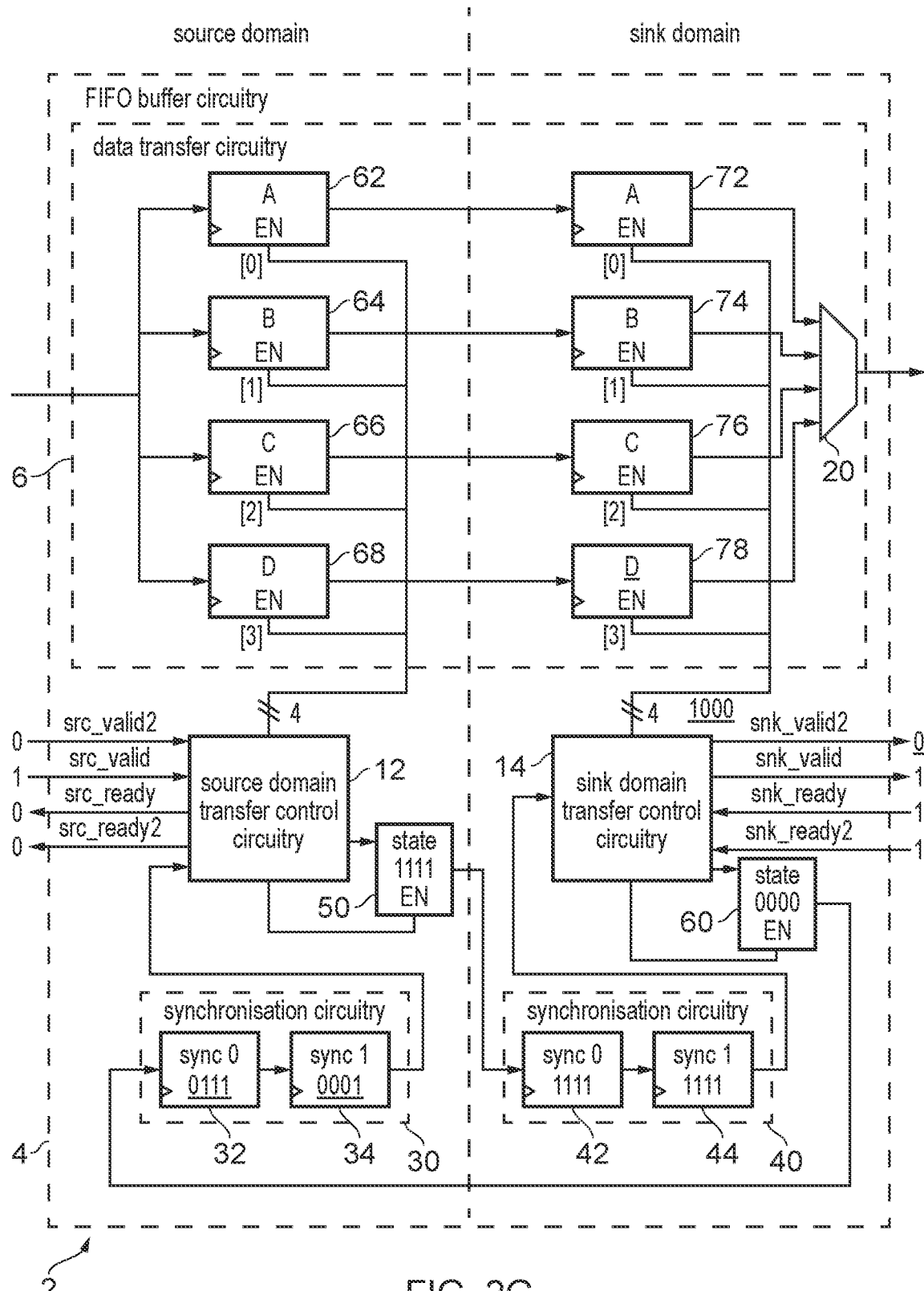

In FIG. 2G illustrating the next clock cycle, the sink domain transfer control circuitry 14 observes the update to the state vector encoding 1111 from the source domain. In response, the sink domain transfer control circuitry 14 sets the enable bit for data storage element 78 to 1 to cause the data item D to be read into data storage element 78 and sets snk_valid to 1 and snk_valid2 to 0 to indicate that one data item is ready to be transferred out to the downstream circuitry. The state vector in state vector storage 60 is also updated to reflect indicate that all of the data storage elements 62-68 have been read from.

The sync1 storage element 34 in the source domain now stores 0001 and so on the next cycle, the source domain transfer circuitry 12 will be able to detect that the sink domain has read the data item A from data storage element 62. Consequently, further data items to be transferred will be able to be accepted on the source side and the transfer of further data across the clock domain boundary resumed.

Thus, the apparatus 2 is able to transfer data across the clock domain boundary ensuring the accuracy of transfer of the data items whilst also supporting multi-item data transfers.

The operation of the apparatus 2 in FIGS. 2A-2G can also be illustrated with the following table which indicates for each of several components of the apparatus their state at each cycle.

| FIG. | 2A | 2B | 2C | 2D | 2E | 2F | 2G |
|---|---|---|---|---|---|---|---|
| Cycle | 0 | 1 | 2 | 3 | 4 | 5 | 6 |
| Input data | A | B + C | D | | | | |
| Output data | | | | | A | B + C | D |
| Src state | | 0001 | 0111 | 1111 | 1111 | 1111 | 1111 |
| Snk sync0 | | | 0001 | 0111 | 1111 | 1111 | 1111 |
| Snk sync1 | | | | 0001 | 0111 | 1111 | 1111 |
| Snk state | | | | | 0001 | 0111 | 1111 |
| Src sync0 | | | | | | 0001 | 0111 |

-continued

| FIG. | 2A | 2B | 2C | 2D | 2E | 2F | 2G |
|---|---|---|---|---|---|---|---|
| Cycle | 0 | 1 | 2 | 3 | 4 | 5 | 6 |
| Src sync1 | | | | | | | 0001 |
| Reg 0 (62) | | A | A | A | A | A | A |
| Reg 1 (64) | | | B | B | B | B | B |
| Reg 2 (66) | | | | C | C | C | C |
| Reg 3 (68) | | | | | D | D | D |

Figure 3:
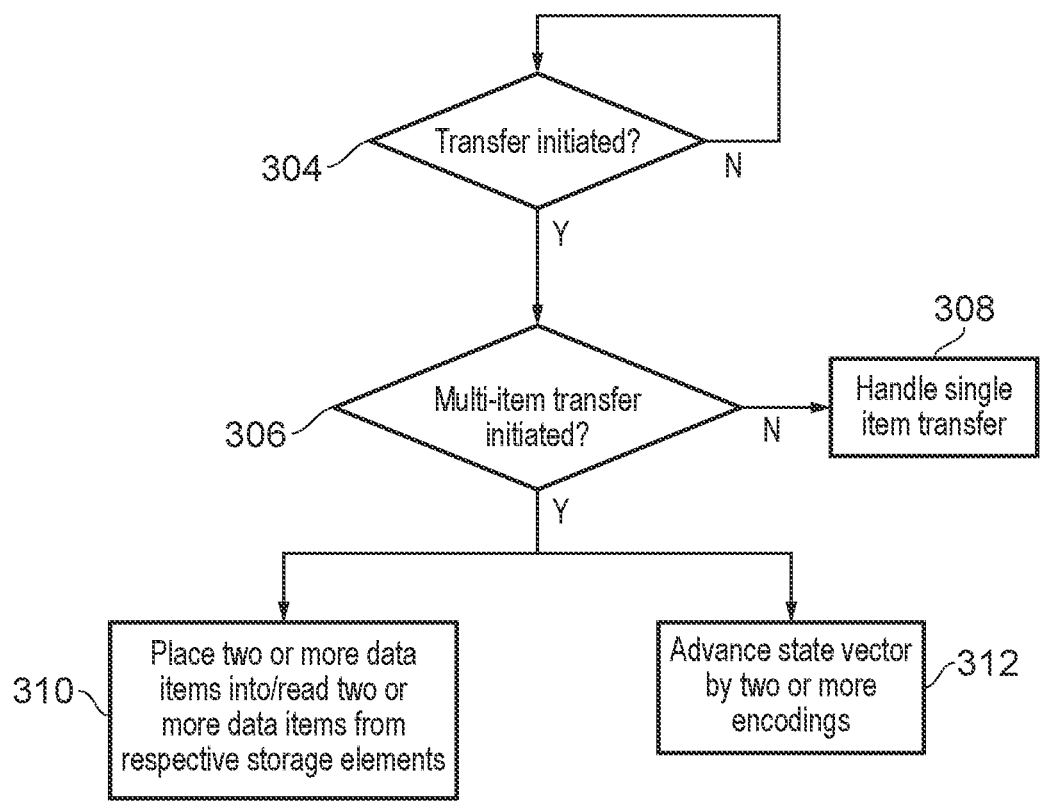
FIG. 3 is a flowchart illustrating the operation of an apparatus that implements the first technique described herein.

FIG. 3 is a flowchart illustrating the operation of an apparatus implementing the first technique described herein.

If a transfer is initiated, as determined at step 304, the flow proceeds to step 306 where it is determined whether the transfer is a single item transfer or a multi-item transfer of two or more data items across the clock domain boundary in a single clock cycle of a respective domain. For a single item transfer, the transfer is handled at step 308.

If the transfer is a multi-item transfer, at step 310 the transfer control circuitry in the respective domain either places the two or more data items to be transferred into respective data storage elements or reads the two or more data items from respective data storage elements (depending on whether the transfer was initiated in the source or sink domains). Additionally, at step 312, the state vector is advanced by two or more state vector encodings to reflect the transfer of the two or more data items in the single clock cycle.

Figure 4:
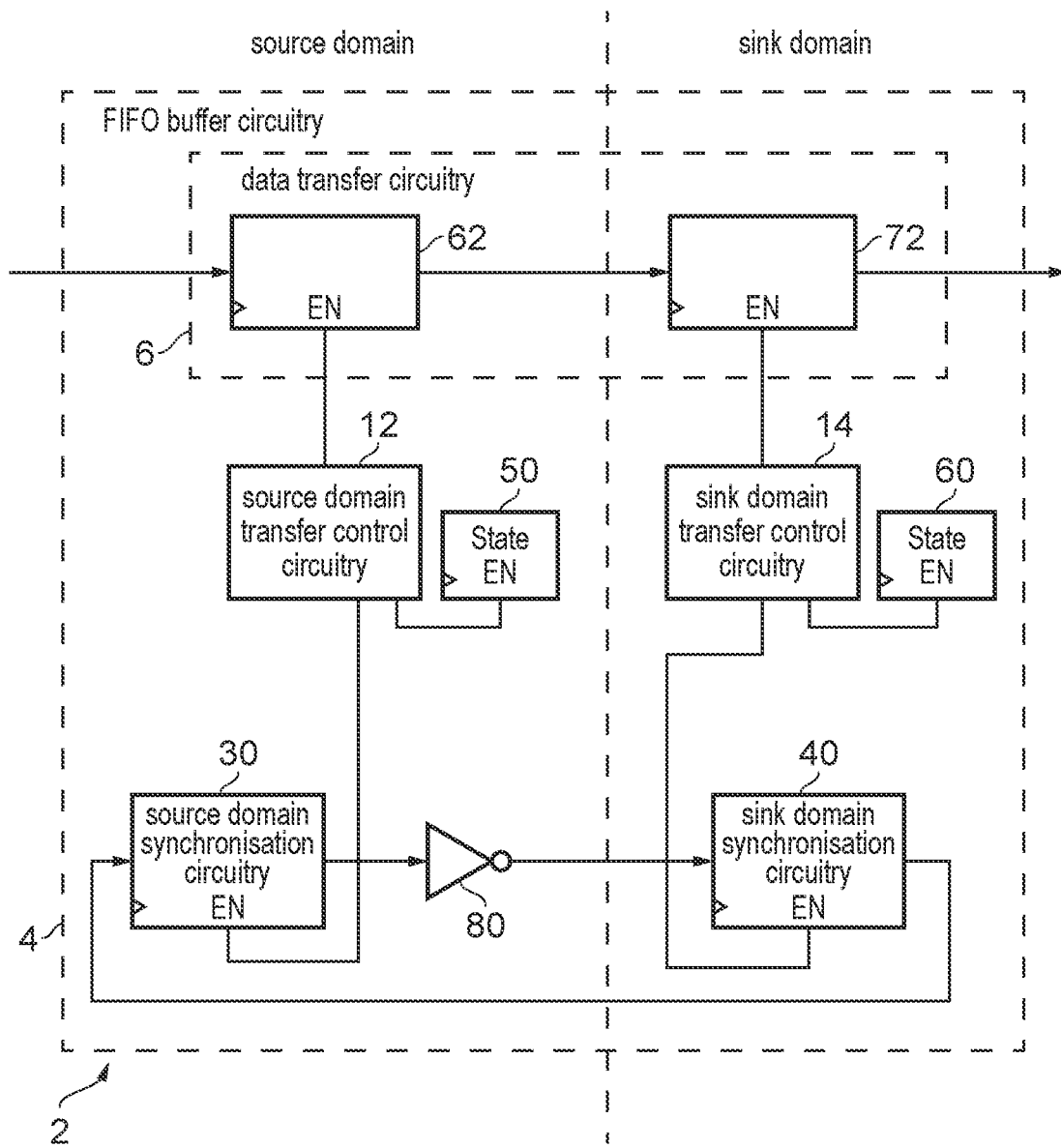
FIG. 4 is a schematic illustration of an apparatus implementing the second technique described herein.

FIG. 4 is a schematic illustration of an apparatus 2 implementing the second technique described herein. As with the apparatus 2 described in relation to FIG. 1 and FIGS. 2A-2G, the apparatus 2 is to transfer data items from a source domain to a sink domain across a clock domain boundary. The apparatus is provided with FIFO buffer circuitry 4 having data transfer circuitry 6. In this case however, the data transfer circuitry 6 comprises only a single data storage element 62, 72 in each clock domain. In other examples, the data transfer circuitry 6 may have more data storage elements (i.e., the FIFO buffer circuitry 4 will have a larger depth) or the data storage element 62, 72 in one of the clock domains may be omitted.

Again there is provided transfer control circuitry 12, 14 in each of the source and sink domains to maintain respective state vectors in state vector storage elements 50, 60. Since there is only a single data storage element 62, 72 in each of the clock domains, the state vector in this example comprises only a single bit which is toggled to indicate that the data storage element 62 has been written to/read from.

As depicted in FIG. 4, the FIFO buffer circuitry 4 comprises synchronisation circuitry 40 in each domain. Here, the synchronisation circuitry 30, 40 is clock-gated by an enable signal controlled by the transfer control circuitry 12, 14 in the domain of the synchronisation circuitry 30, 40. Clock-gating refers to a technique whereby the clock signal to the components (in this case the synchronisation circuitry 30, 40) can be selectively and temporarily disabled. This has the effect that the synchronisation circuitry 30, 40 does not advance its state while the clock signal is disabled. The transfer control circuitry 12, 14 is thus able to arrest the propagation of the state vector signal around the loop formed by the source domain synchronisation circuitry 30, the sink domain synchronisation circuitry 40, and the inverter 80.

In this implementation, where the second technique described herein is employed, the output of source domain synchronisation circuitry 30 feeds back to the sink domain via an inverter 80. The sink domain synchronisation circuitry 40 is similarly clock-gated by an enable signal from the sink domain transfer control circuitry 14 with its output leading directly to the source domain. In this way, and as will be explained in more detail in relation to the worked example of FIGS. 5A-5G, this arrangement can reduce the round-trip time to signal changes in the state of the FIFO buffer circuitry 4 and hence increase the throughput of the FIFO buffer circuitry 4.

As depicted, the inverter 80 is positioned between the source domain synchronisation circuitry 30 and the sink domain synchronisation circuitry 40; however, in other examples the inverter 80 is positioned elsewhere in the loop (e.g., on the return path from the sink domain synchronisation circuitry 40 to the source domain synchronisation circuitry 30).

Although not explicitly depicted, the transfer control circuitry 12, 14 in each domain is able to read the contents of each of the storage elements including the sync1 data storage elements 34, 44.

Figure 5A:
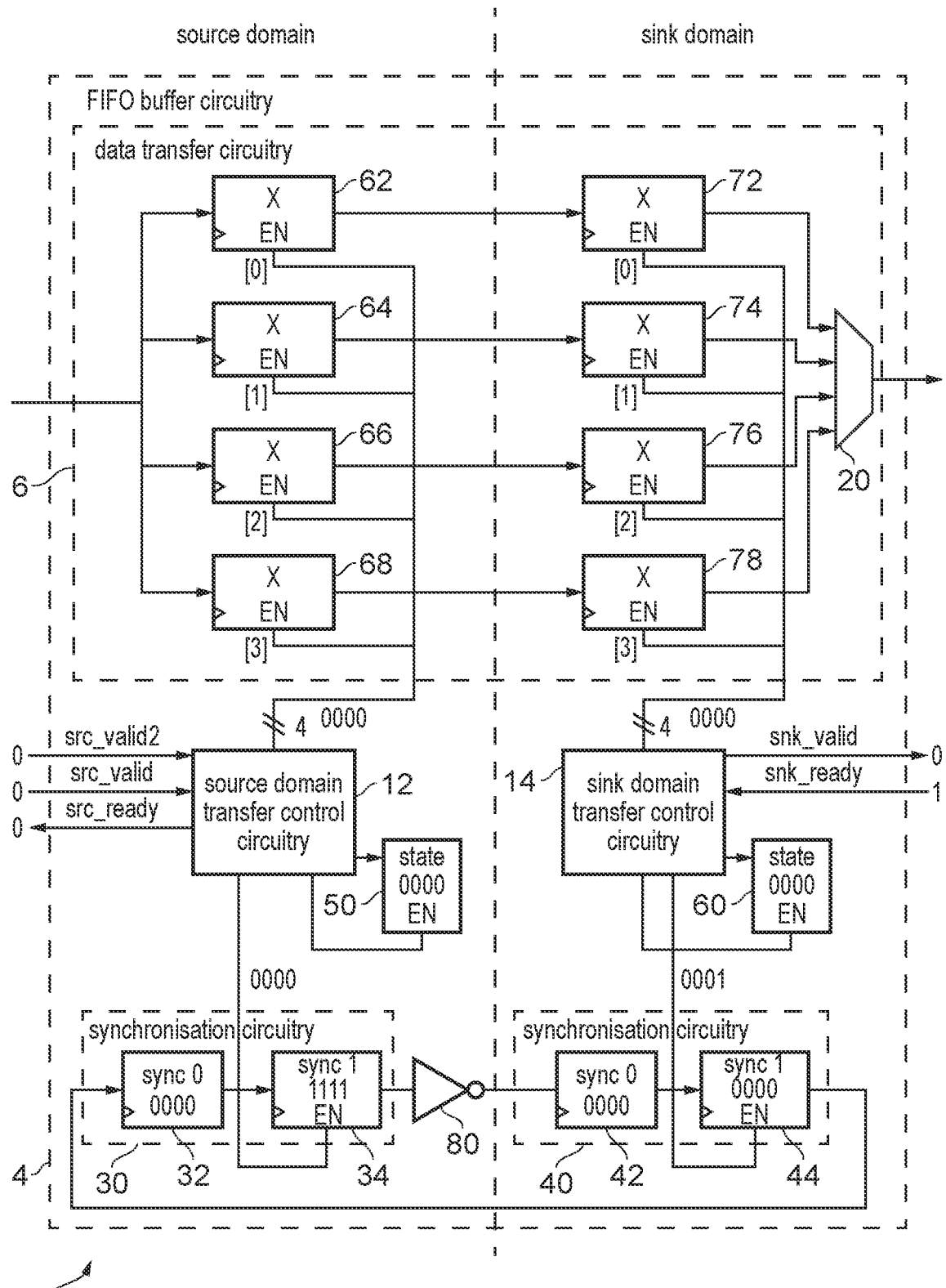
FIGS. 5A-5G illustrate a worked example of an apparatus that implements the second technique described herein being used to transfer data across a clock domain boundary.
Figure 5B:
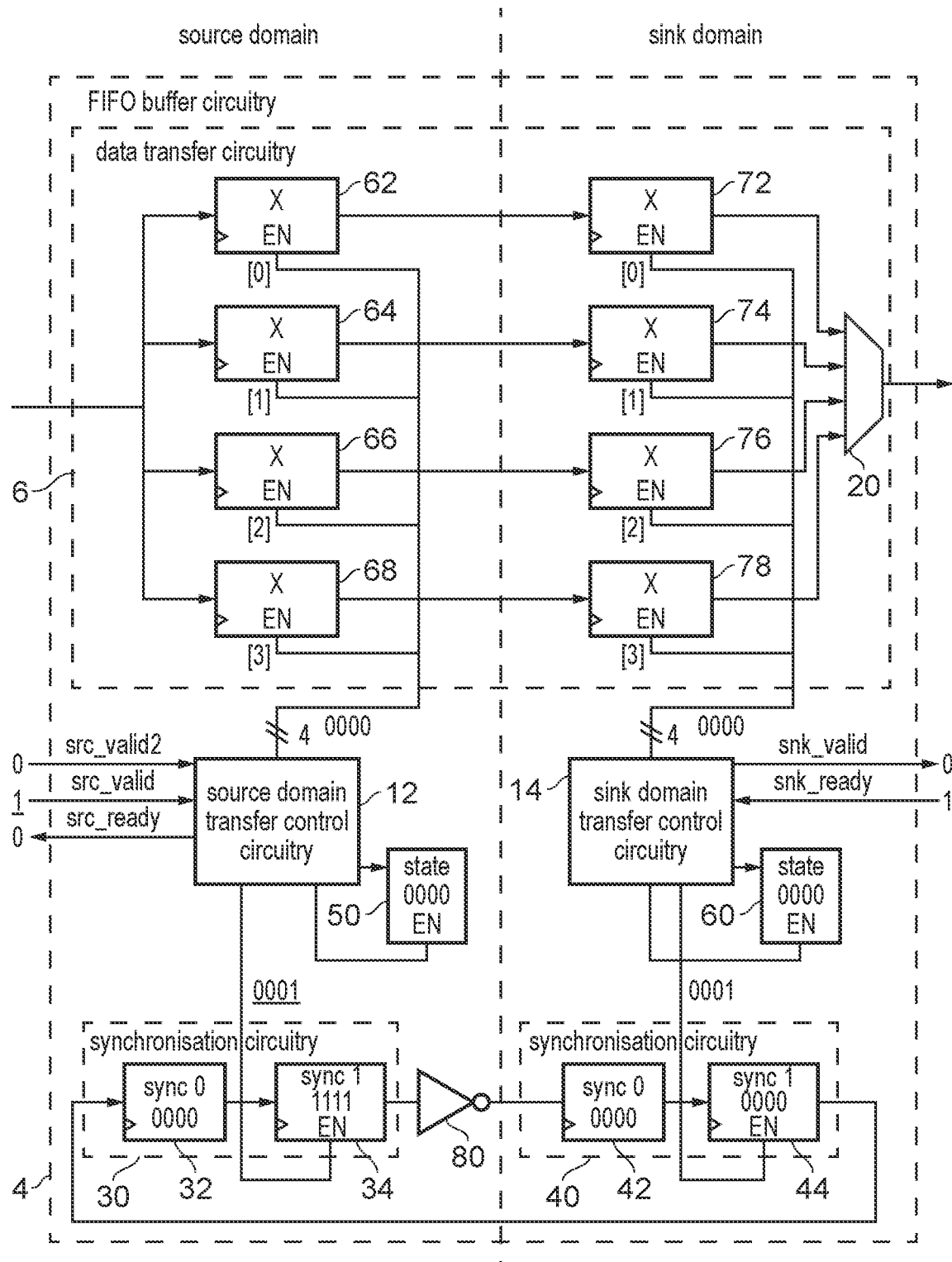

FIGS. 5A-5G illustrate a worked example of an apparatus 2 implementing the second technique described herein being used to transfer data across a clock domain boundary. FIG. 5A largely corresponds to the apparatus 2 depicted in FIG. 4; however, the apparatus in this example has four data storage elements 62-68, 72-78 in each of the source domain and the sink domain. Additionally, the synchronisation circuitry 30, 40 in this example comprises two data storage elements 32, 34, 42, 44 connected in series. The latter of the two data storage elements 34, 44 in each domain is clock-gated by the enable signal from the transfer control circuitry 12, 14.

Since there are four data storage elements in each domain and with the encoding being used, each state vector encoding is represented by four bits. The synchronisation circuitry 30, 40 therefore propagates state vectors having four bits. Rather than clock-gating the synchronisation elements sync1 34, 44 in each domain entirely by a single enable signal, the individual lanes of those synchronisation elements are individually clock-gated as illustrated with the 4-bit enable signal from each of the source domain transfer control circuitry 12 and the sink domain transfer control circuitry 14.

FIG. 5A shows an initial state of the FIFO buffer circuitry 4 where the contents of the data storage elements 62-68, 72-78 are undefined, the source domain transfer control circuitry 12 has set a src_ready flag to 0 to indicate that it is not ready to receive a new data item, the state vector maintained in the state vector storage element 50, 60 in each domain is 0000, none of the bits of the sync1 storage element 34 are enabled in the source domain and only a final bit of the sync1 storage element 44 in the sink domain is enabled to indicate that the sink domain is ready to receive an update in its state. Since updates in the state of the FIFO buffer circuitry 4 are signalled by toggling bits of the state vector, the state vector encoding initially in the synchronisation 1 storage element 34 in the source domain side is 1111 (which will appear as 0000) once passed through the inverter 80 (which operates bitwise to invert each bit of the state vector encoding it receives).

On the subsequent cycle, the upstream circuitry sets the src_valid signal to 1 to indicate that the upstream circuitry is ready to provide a data item to be transferred through the FIFO buffer circuitry 4. In response, the source domain transfer control circuitry 12 sets the enable signal to the synchronisation circuitry 30 in the source domain to 0001.

Figure 5C:
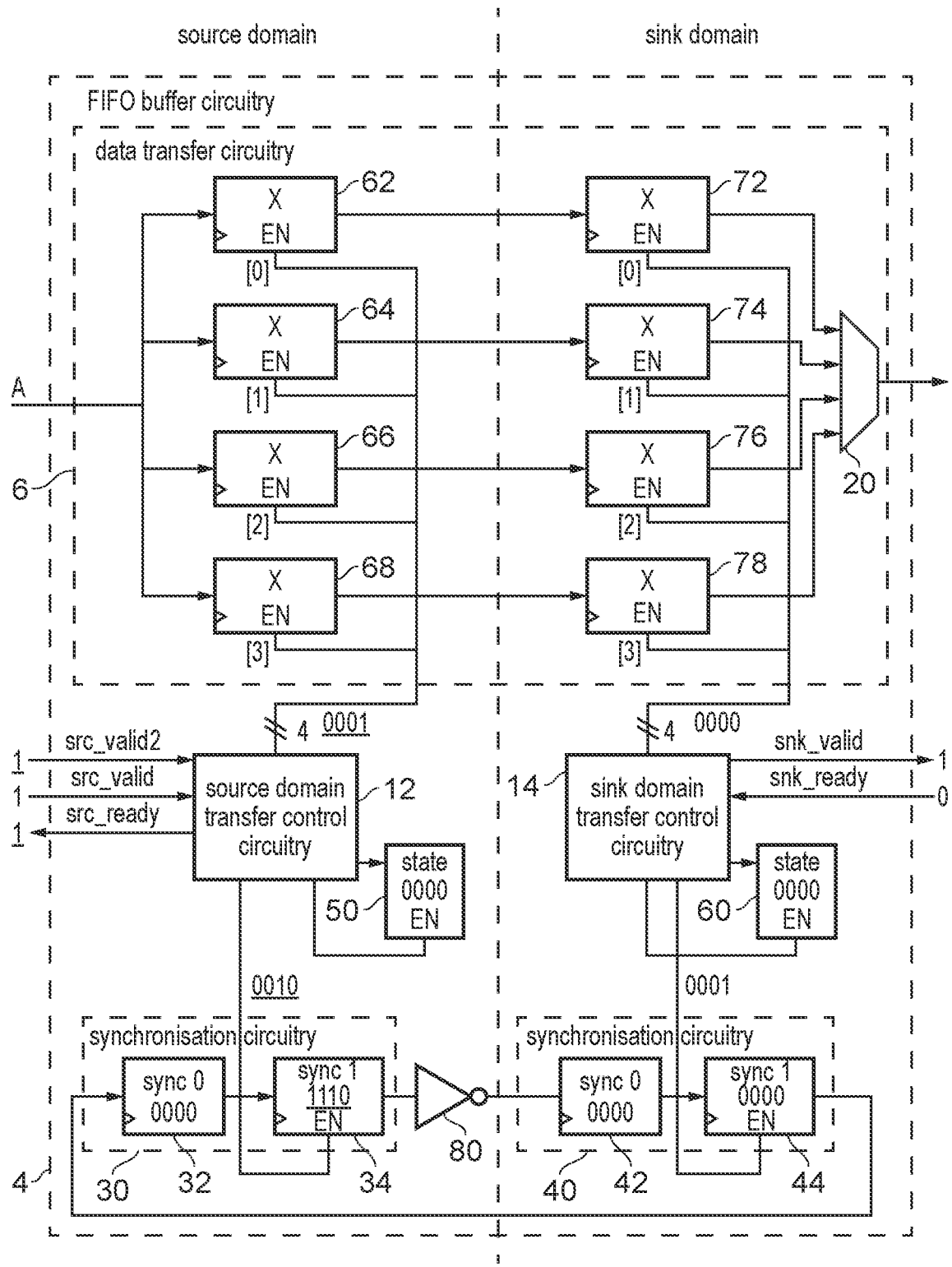

This allows a 0 to be read into the right-most bit position of the sync1 storage element 34 on the subsequent cycle, as depicted in FIG. 5C.

In FIG. 5C, the sync1 storage element 34 has now transferred in the 0 in the right-most bit position from the sync0 storage element 32. The source domain transfer control circuitry 12 has also enabled the data storage element 62 to read in the data item and updated the enable signal to the synchronisation circuitry 30 to 0010, thereby enabling the second bit of the sync1 storage element.

Also illustrated in FIG. 5C, the src_valid2 flag has been set to indicate that two data items are ready to be transferred from the upstream circuitry through the FIFO buffer circuitry.

Figure 5D:
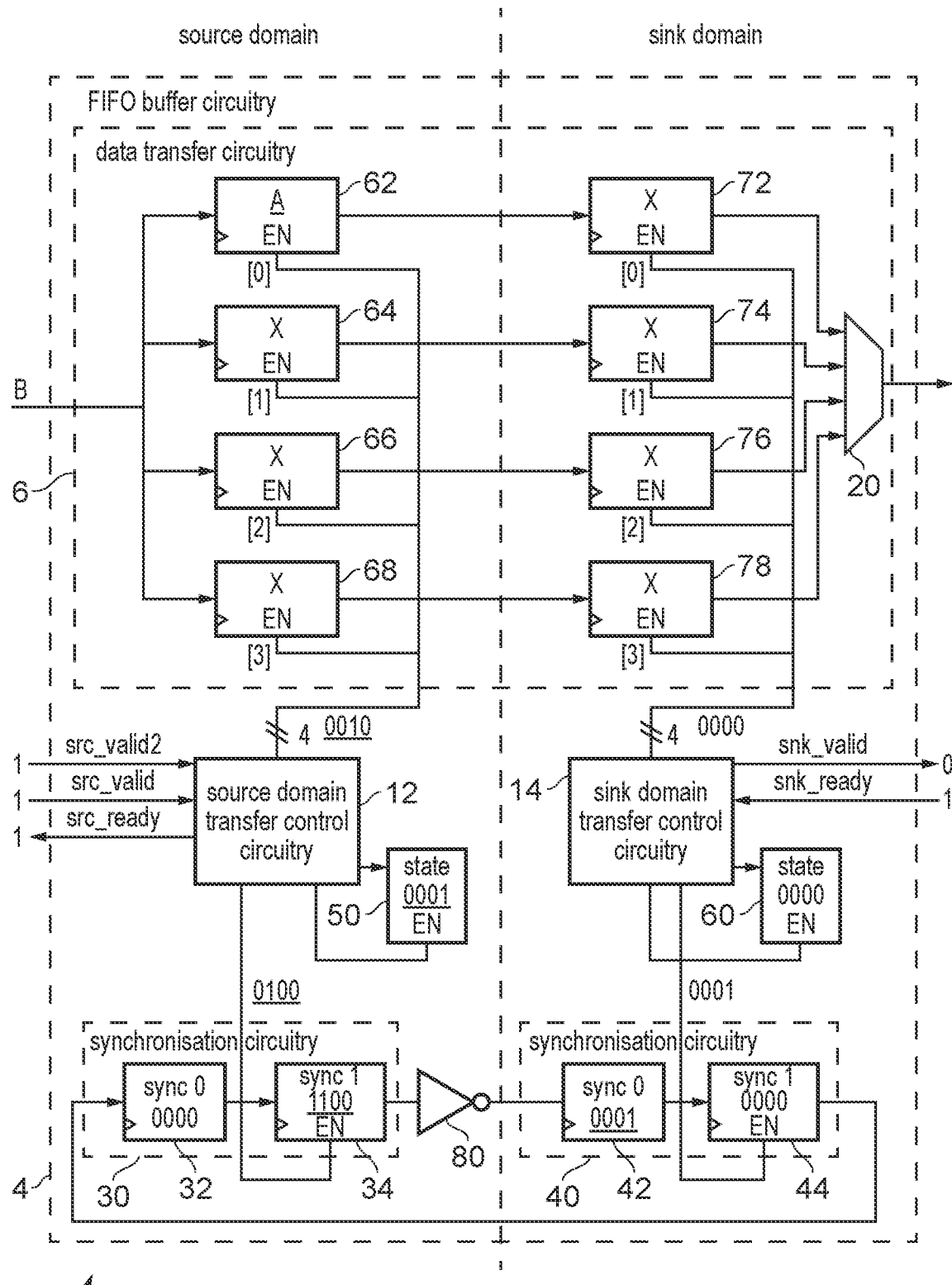

As a result, on the next cycle which is depicted in FIG. 5D, the sync0 storage element 42 in the sink domain side has observed the update to the state vector such that the sync0 storage element 42 stores 0001. The sync1 storage element 34 has also been updated as a result of the second bit being enabled in the previous cycle so that sync1 now stores 1100 corresponding to a state vector encoding of 0011 once it has been inverted.

On this cycle, the data item A has been read into data storage element 62 and the enable signal to the data storage element 64 set to 1 to allow a new data item to be read into that data storage element 64. The state vector in state vector storage element 50 has been updated to the state vector encoding 0001 to indicate that the data storage element 62 has been occupied and that the next data storage element to transfer data into is data storage element 64.

The src_valid and src_valid2 signals are still asserted so to advance the indication of the state being passed to the sink domain and the source domain transfer control circuitry 12 sets the enable bit for the next element of the state vector that is to be updated (which in this case is the third bit from the right).

Figure 5E:
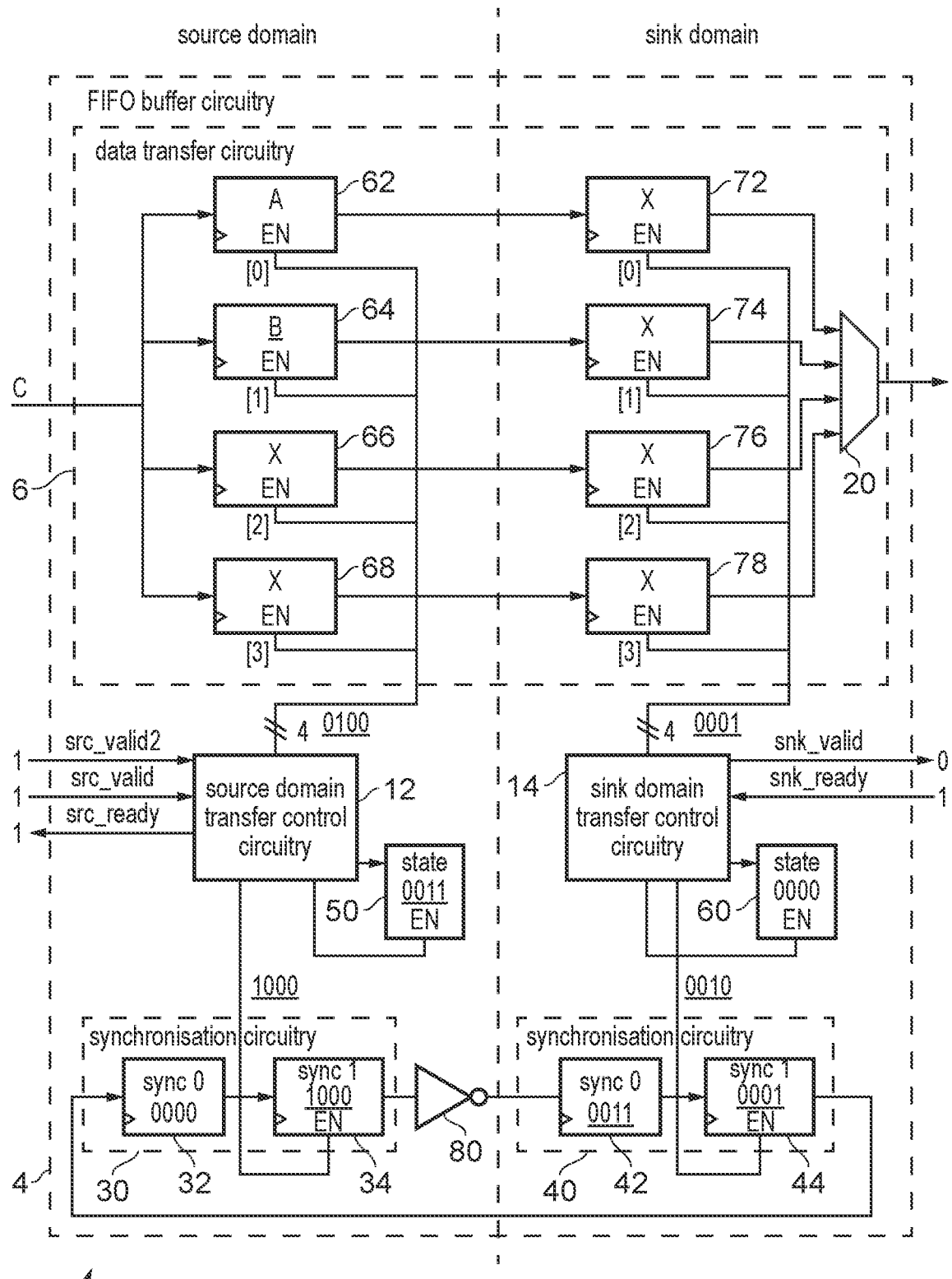

In FIG. 5E, the sync1 data storage element 44 in the sink domain has now observed the update to the state vector propagated from the source domain and so reads 0001. This update signals to the sink domain that a data item is ready to be transferred out of data storage element 62 so the sink domain transfer control circuitry 14 sets the enable bit for data storage element 72 to 1 to cause the data item A to be read into data storage element 72 on the next cycle.

The state vector encoding 0001 will next be transferred back into the source domain where it will be interpreted as an indication that the data item A has been read into the sink domain. Thus, by enabling the right-most bit of the sync1 storage element 44 in the sink domain on the previous cycle, the sink domain has committed to reading in the next data item once the state vector encoding indicating that the data item is ready to be transferred has been received in the sink domain. Notably, after the update to the state vector being observed by the sink domain, there is no further opportunity for the sink domain transfer control circuitry 14 to arrest the progress of the state vector update back to the source domain since the sync1 storage element 44 is connected directly to the synchronisation circuitry 30 in the source domain. Rather, the sink domain transfer control circuitry 14 signals its readiness to read data items into the sink domain by advancing the enable bits issued to the sync1 data storage element 44.

To indicate that the sink domain transfer control circuitry 14 is ready to receive a next data item therefore, the sink domain transfer control circuitry 14 updates the enable signal to the sync1 data storage element 44 to enable the second bit of that storage element.

On the source side, in this cycle, the data item B has been transferred into the data storage element 64 and the enable signal to data storage element 66 has been set to transfer in the next data item to that data storage element.

Again, the source domain transfer control circuitry 12 has set the enable bit for the next element of the state vector encoding (here the left-most bit) to indicate that the source domain is ready to transfer in a new data item on the next cycle. As discussed above for the sink domain, the update to source domain transfer control circuitry 12 also commits to updating the state vector a cycle in advance of the cycle on which the actual state is updated to the state represented by the new state vector. This approach allows the latency in signalling the updates to the state vectors to be reduced and thus increases the throughput of the FIFO buffer circuitry 4.

Figure 5F:
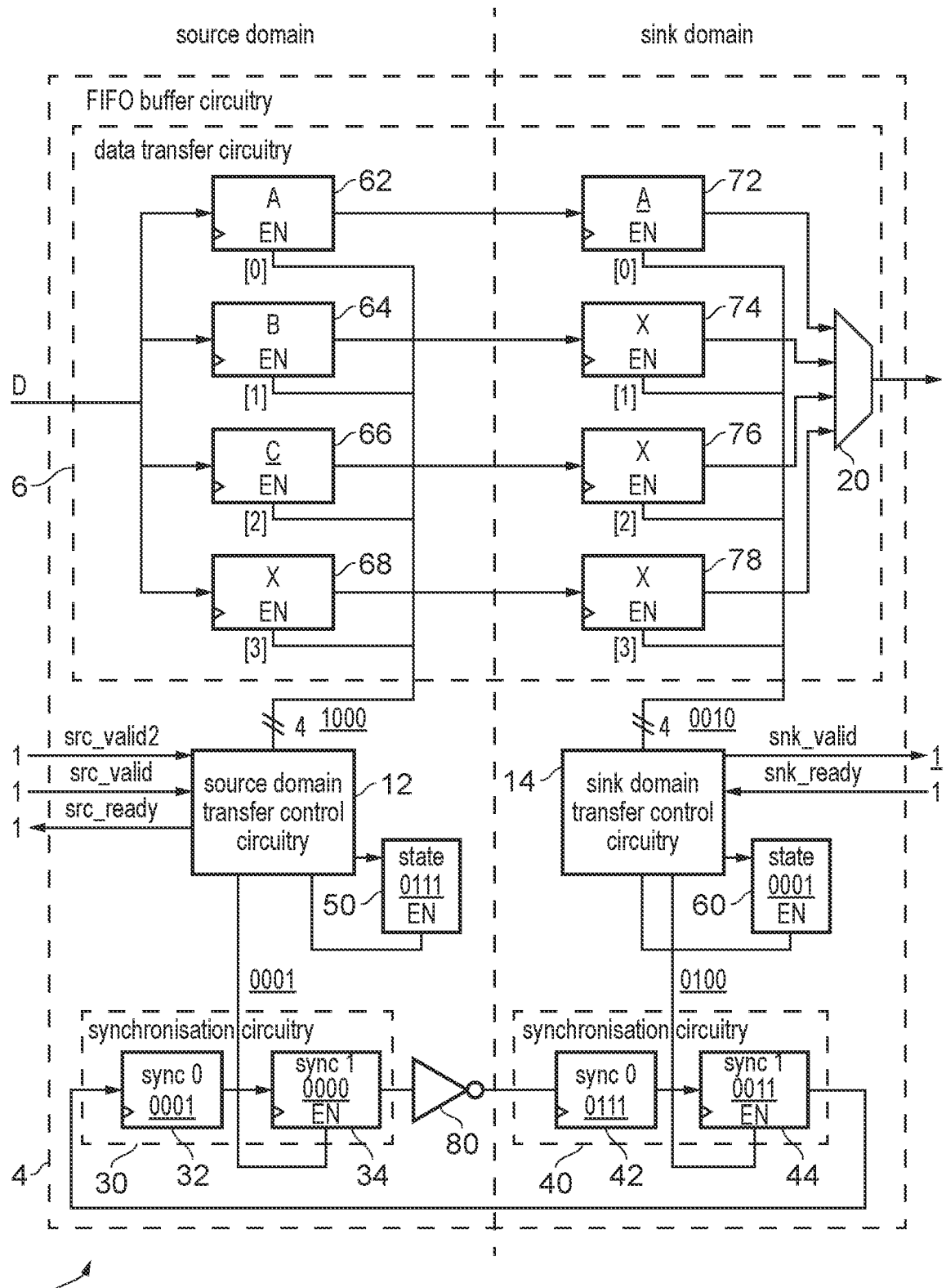
Figure 5G:
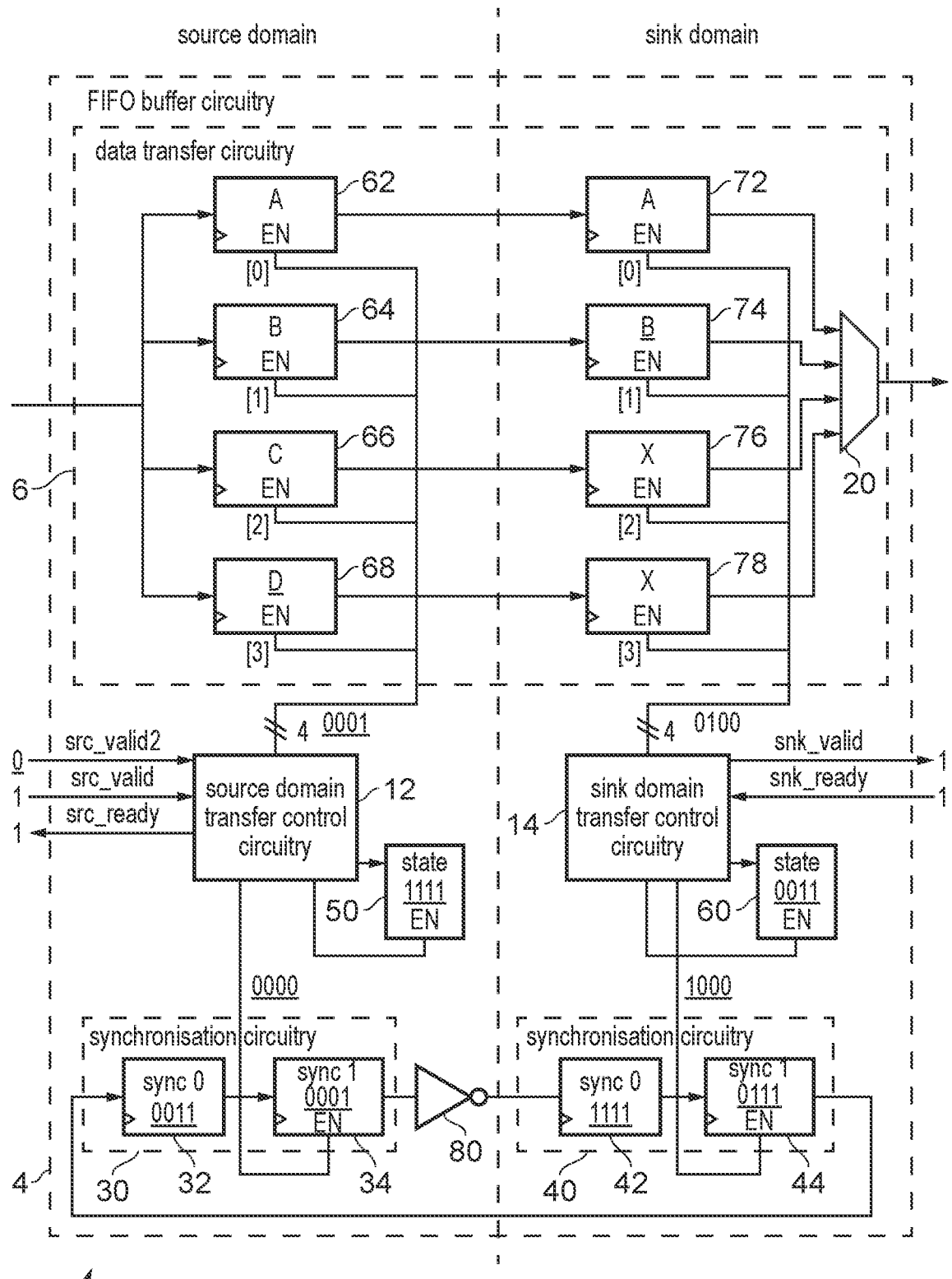

In FIG. 5F, illustrating the next clock cycle, the data item A has been read into the data storage element 72 and the state vector storage element 60 has been updated to reflect this. The sync1 storage element 44 in the sink domain has been updated to 0011 as the next bit is read in from the sync0 storage element 42 which indicates that a data item is ready to be transferred from data storage element 62. As such, the sink domain transfer control circuitry 14 sets the enable bit to effect this transfer. Since the sink domain transfer control circuitry 14 is ready to receive a new data item on the next cycle, the enable signal for the next bit of the sync1 storage element 44 to be updated is set to 1.

In the source domain, the data item C has been read in and the enable signal for data storage element 68 is set to 1 to read in a new data item on the next cycle. To reflect this state, the state vector storage element 50 stores the state vector encoding 0111.

Because the source domain is ready to read in a new data item on the next cycle, the enable signal for the next bit of the sync1 storage element 34 to be updated is set to 1. If the source domain were not ready to read in a new data item, the source domain transfer control circuitry 12 could signal this by not setting the enable signal for the sync1 storage element 34.

Finally, in FIG. 5F, illustrating the next clock cycle, the sync1 storage element 34 in the source domain now stores the state vector encoding 0001. This update received from the sink domain indicates that the sink domain has read the data item from data storage element 62 and so this data storage element 62 is now safe to be overwritten. Consequently, the source domain transfer control circuitry 12 enables the data storage element 62 to allow the next data item to be transferred into this data storage element 62 on the next clock cycle.

The data item D has been read into data storage element 68 and so the state vector maintained by the source domain transfer control circuitry 12 is now updated to be 1111 to indicate that the next data storage element in to which a data item is to be transferred is data storage element 62.

In the sink domain, data item B has been read from data storage element 64 and the state vector in state vector storage element 60 updated to reflect this. Since the sink domain transfer control circuitry 14 is ready to continue reading data items from the data storage elements, the sink domain transfer control circuitry 14 sets the enable signal to cause the next bit of the sync1 storage element 44 to be updated to 1.

As described with reference to FIGS. 5A-5G, there is therefore provided a technique by which a shortened feedback loop can be used to communicate changes in state between the source and sink domains. In particular, by clock-gating the synchronisation circuitry 30, 40 and allowing the output of the synchronisation circuitry 30, 40 to be fed back around the loop into the opposite domain, the round-trip time to communicate a new data item being transferred into the data storage elements by the source domain, and then being read into the sink domain can be reduced.

By virtue of the transfer control circuitry 12, 14 signalling the enable signal to the synchronisation circuitry 30, 40 on the cycle before the update to adopt the state being signalled is reached, if the other domain is operating at a clock frequency of more than twice the clock frequency of the domain updating the state vector in this way, there is a chance of an error occurring. For example, the source domain transfer control circuitry 12 may set the enable signal to the synchronisation circuitry 12 to indicate that a data item will be read into data storage element 62 on the next source domain clock cycle. If however, the sink domain is operating with a high enough clock frequency, a consequential update to the sync1 data storage element 34 in the sink domain and the synchronisation circuitry 40 in the sink domain could occur before the FIFO buffer circuitry 4 in the source domain has actually loaded the data item into the data storage element 62. In such a case, the sink domain transfer control circuitry 14 could effect a transfer from the data storage element 62 before the new data item had been written to the data storage element 62. This would therefore lead to the wrong data item being transferred through the FIFO buffer circuitry 4.

As such, this technique may be employed only in FIFO buffers spanning clock domain boundaries for which a difference in the clock frequencies is less than a factor of two or more generally less than the predetermined timing factor. In some examples, the clock frequencies in one or both domains are programmable and so a first synchronisation path of the form described herein with reference to FIGS. 4 and 5A-5G may be employed in addition to a second synchronisation path (e.g., of the form of the one depicted in FIGS. 1 and 2A-2G). The FIFO buffer circuitry 4 may be arranged to selectively use the first synchronisation path when the clock frequencies in the two domains differs by less than a factor of two and to use the second synchronisation path when the clock frequencies differ by more than a factor of two.

The operation of the apparatus 2 in FIGS. 5A-5G can also be illustrated with the following table which indicates the state of components of the apparatus at different clock cycles.

| FIG.        | 5A | 5B   | 5C   | 5D   | 5E   | 5F   | 5G   |
|-------------|----|------|------|------|------|------|------|
| Cycle       | 0  | 1    | 2    | 3    | 4    | 5    | 6    |
| Input data  |    | A    | A    | B    | C    | D    | E    |
| Output data |    |      |      |      |      | A    | B    |
| Src sync0   |    |      |      |      |      | 0001 | 0011 |
| Src sync1   |    |      | 1110 | 1100 | 1000 | 0000 | 0001 |
| Snk sync0   |    |      |      | 0001 | 0011 | 0111 | 1111 |
| Snk sync1   |    |      |      |      | 0001 | 0011 | 0111 |
| Src state   |    |      |      | 0001 | 0011 | 0111 | 1111 |
| Snk state   |    |      |      |      |      | 0001 | 0011 |
| Reg 0 (62)  |    |      |      | A    | A    | A    | A    |
| Reg 1 (64)  |    |      |      |      | B    | B    | B    |
| Reg 2 (66)  |    |      |      |      |      | C    | C    |
| Reg 3 (68)  |    |      |      |      |      |      | D    |

Figure 6:
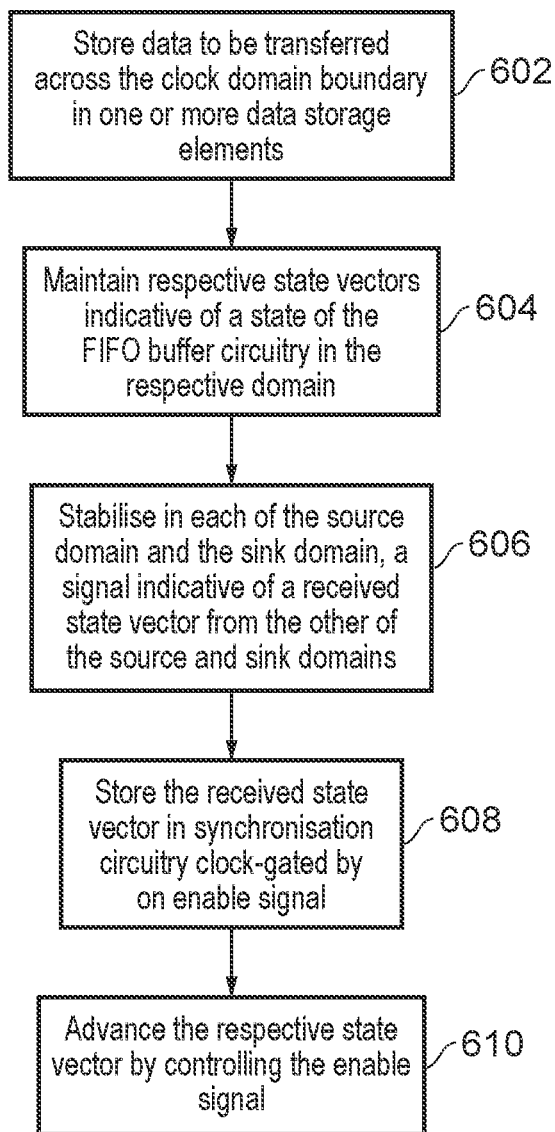
FIG. 6 is a flowchart illustrating the operation of an apparatus that implements the second technique described herein.

FIG. 6 is a flowchart illustrating the operation of an apparatus implementing the second technique described herein. Step 602 describes the storing of data to be transferred across a clock domain boundary in data storage elements. When a data item is to be transferred across the domain boundary, the data item is stored in these data storage elements until it can be read into the sink domain.

Described at step 604 is the operation of the transfer control circuitry which operates to maintain respective state vectors in each of the source domain and the sink domain to track the state of the FIFO buffer circuitry (i.e., which data storage elements have been written to/read from).

Step 606 describes the stabilisation of signals received from the opposite by synchronisation circuitry in each of the source domain and the sink domain which may be performed by two or more data storage elements in series for example.

Step 608 describes storing a state vector received from the other clock domain indicative of the state of the FIFO buffer in that domain in synchronisation circuitry. The synchronisation circuitry is gated by an enable signal allowing the transfer control circuitry in the respective domain to control when the synchronisation circuitry is updated.

Step 610 describes advancing the state vector in the respective domain by controlling the enable signal to allow the received state vector to be propagated back into the other domain (possibly via an inverter) to signal the update in the state.

FIG. 7 is a table illustrating an example state vector encoding that may be used with the techniques described herein. Each state vector encoding represents a state of the FIFO buffer circuitry in the source domain or the sink domain. Specifically, the state vector encoding indicates which is the next data storage element (e.g., register) to be written to in the source domain and which is the next data storage element that is to be read from in the sink domain.

FIG. 7 illustrates for each valid state vector which of four data registers are the next to be written to/read from when the state vector encoding is interpreted as a source state vector/a sink state vector.

The state vector encoding illustrated in FIG. 7 has the properties that:
(a) each bit of the state vector encoding represents a state of a corresponding element. That is, updates to a particular register are indicated by toggling a particular bit. For example toggling the right-most bit to go from 0000 to 0001 indicates in the source domain that the 0 register has been written to and in the sink domain that the 0 register has been read from. Toggling that same bit to go from 1111 to 1110 similarly indicates that the 0 register has been written to/read from;
(b) successive state vector encodings corresponding to successive states of the FIFO buffer circuitry differ by a change in only one element of the state vector encoding. This can be seen in FIG. 7 for which adjacent state vector encodings on adjacent lines differ by a change in only one bit; and
(c) an order in which each element of the state vector encoding is updated to indicate successive states of the FIFO buffer circuitry is fixed. Again, this can be seen in FIG. 7 where there is a fixed order (rightmost digit to leftmost digit) in which the bits are updated.

It will be appreciated that the example encoding shown in FIG. 7 represents only one way in which these conditions can be satisfied where four data registers are used and more encodings satisfying these criteria exist for the case with four data registers and even more encodings where other numbers of data registers are used. Such encodings can be formulated for cases with one or two data registers; however, these may represent trivial encodings (e.g., for one data register, the encoding is a single bit that is toggled).

This form of encoding may be particularly suitable when used with the first and second techniques described herein. With regard to the second technique, the transfer control circuitry in each domain in which the technique is applied is able to arrest the updating of state vector encoding by not setting the enable bits to the synchronisation circuitry. Once the transfer control circuitry is able to proceed again, the transfer control circuitry needs to be able to advance the state vector by only a single state vector encoding even where the input to the synchronisation circuitry has advanced by several states. This is because whatever state vector encoding is read into the synchronisation circuitry is then transferred into the other domain as indication of the first domain's state. The transfer control circuitry therefore needs to be able to act on the FIFO buffer circuitry to achieve the state that is read into the synchronisation circuitry on the clock cycle after that state is read in. Thus if the transfer control circuitry can only effect a single transfer in a clock cycle, the transfer control circuitry needs to be able to advance the state vector by a single state vector encoding.

With the encoding having the above properties, this is possible since the transfer control circuitry can enable only the bit corresponding to the next data storage element that is to be updated according to the first-in, first-out order. If this bit has been toggled, then the transfer control circuitry can determine that a transfer operation needs to be carried out on the corresponding data storage element. Thus, by advancing only one bit of the state vector, the transfer control circuitry can determine whether an update has occurred. This is not the case more generally where the entire encoding may need to be evaluated in order to determine whether the state of the other domain has progressed.

FIG. 8 illustrates possible state vector encodings that could be observed when updating a state vector by more than one state vector encoding in a single clock cycle. This figure illustrates why encodings of the form described above may be suitable when employing the first technique described herein. Where a multi-item transfer takes or otherwise, an update in the state vector by two or more state vector encodings may be signalled to the other domain. However, when this update is signalled across a clock domain boundary, it is possible that only part of the update to the state vector will be observed in the other domain.

Taking the example of FIG. 8 where an update to the state vector 0000 by two state vector encodings to 0011 has occurred, in the clock domain receiving the updated state vector, four possible state vector encodings could be observed (as illustrated in FIG. 8).

Before any update has been observed in the receiving domain, the state 0000 is present and so no action will be taken by the receiving domain in respect of the state vector update.

If both updated bits are observed in the receiving domain such that the state vector is received as 0011, the receiving domain will determine that the state has been advanced by two successive states and can transfer in/out two data items from the data storage elements.

However, if only one of the two bits to be updated are observed due to the unpredictability in transferring the state vector across the clock domain, the state 0001 could be observed. In this case, with the encoding set out in FIG. 7, this state vector encoding is both valid and represents an intermediate state between 0000 and 0011. As such, it is safe for the receiving domain to act on this state as if it were indicating an update to the state 0001 (rather than 0011 being mis-signalled) as a further update to the state vector will reflect the next state vector update to the intended encoding of 0011.

According to other possible encodings, it is possible, where only a subset of bits being changed are properly observed in the receiving domain, for a valid state to be observed that does not occur between the initial state and the state that is intended to be signalled. If the receiving domain acts on this valid but incorrect state, the FIFO buffer could exhibit incorrect and unpredictable behaviour.

If instead the receiving domain observed the updated state vector encoding of 0010, the receiving domain would be able to identify that this is not a valid state vector encoding since it does not respect the fixed ordering of updates to state vector bits/data storage elements. As such, the receiving domain may be able to determine that the state vector encoding has been improperly signalled and either wait until a valid state vector is received, or identify that the invalid state vector encoding 0010 would be observed in case of a misinterpretation of 0011 and so treat the invalid state vector as if it had read 0011.

For some transitions, it is also possible for a valid state vector encoding to be observed that does not represent an intermediate state. For example, when transitioning from the state vector 0000 to 1111, the state vector encodings 1110, 1100, or 1000 could observed. These are valid encodings that do not represent valid intermediate states between the start and end encodings. However, these encodings do not represent states that are reachable from the initial encoding. Since there are four data storage elements in this example, maximum number of successive states by which the state vector encoding can be advanced is four (corresponding to four data items being transferred). Thus the receiving domain can determine that any of these encodings 1110, 1100 and 1000 are not the state vector encoding being signalled since they represent states occurring logically after 1111 which would correspond to an advance by four successive states. Consequently, the receiving domain can wait until a valid, reachable state vector encoding is observed in the receiving domain before acting on the update to the state vector.

Thus, an encoding having the properties described above provides improved reliability of communication between the clock domains where either or both of the first and second techniques described herein are employed.

Both the first and second techniques described herein could be employed in the same apparatus. For example, both techniques could be employed within an apparatus 2 as depicted in FIG. 5A. An example of the operation of such an apparatus making use of the first and second techniques can be seen in the following table which indicates for each of several components of the apparatus the most recent data item that their state reflects the transfer of.

| Cycle | 0 | 1 | 2 | 3 | 4 | 5 | 6 |
|---|---|---|---|---|---|---|---|
| Input data | A | B + C | C | D |  | E | F |
| Output data |  |  |  | A | B + C | D |  |
| Src sync0 |  |  |  |  | A | C | D |
| Src sync1 | 1110 | 1000 | 0000 | 0000 | 0001 | 0011 | 0111 |
| Snk sync0 |  | 0001 | 0111 | 1111 | 1111 | 1110 | 1100 |
| Snk sync1 |  |  | 0001 | 0111 | 1111 | 1111 | 1110 |
| Src state |  | 0001 | 0111 | 1111 | 1111 | 1111 | 1110 |
| Snk state |  |  |  | 0001 | 0111 | 1111 | 1111 |
| Reg 0 (62) |  | A | A | A | A | A | E |
| Reg 1 (64) |  |  | B | B | B | B | B |
| Reg 2 (66) |  |  | C | C | C | C | C |
| Reg 3 (68) | D | D | D |  | D |  |  |

Thus there has been described FIFO buffers that are able to provide increased throughput and/or a lower depth. As described herein, this can be achieved through transferring multiple data items in a single clock cycle and/or by providing a reduced round-trip signalling path between the clock domains.

The techniques described herein are illustrated with the following numbered examples.

Example 1. An apparatus comprising:
first-in, first-out (FIFO) buffer circuitry to transfer data from a source domain to a sink domain across a clock domain boundary, the FIFO buffer circuitry comprising:
data transfer circuitry comprising one or more data storage elements to store the data to be transferred across the clock domain boundary;
source domain data transfer control circuitry to maintain a source state vector indicative of a state of the FIFO buffer circuitry in the source domain and sink domain data transfer control circuitry to maintain a sink state vector indicative of a state of the FIFO buffer circuitry in the sink domain;
synchronisation circuitry in each of the source domain and the sink domain to stabilise a signal indicative of a received state vector received from the other of the source domain and the sink domain and to store the received state vector;
wherein for at least one of the source domain and the sink domain:
the respective synchronisation circuitry is clock-gated by an enable signal; and
the respective synchronisation circuitry is responsive to a change in the state of the FIFO buffer circuitry in the respective domain to advance the respective state vector by controlling the enable signal to enable output of one or more elements of the received state vector.

Example 2. The apparatus according to example 1, wherein:
for both the source domain and the sink domain:
the respective synchronisation circuitry is clock-gated by an enable signal; and
the respective data transfer control circuitry is responsive to a change in the state of the FIFO buffer circuitry in the respective domain to advance the respective state vector by controlling the respective enable signal to enable output of one or more elements of a respective received state vector.

Example 3. The apparatus according to example 2, wherein:
the synchronisation circuitry in the source domain and the synchronisation circuitry in the sink domain, together with an inverter, form a loop.

Example 4. The apparatus according to any of examples 1-3, wherein:
the source domain data transfer control circuitry and the sink domain data transfer control circuitry are configured to maintain the source state vector and the sink state vector according to a state vector encoding for which:
each element of the state vector encoding represents a state of a corresponding data storage element;
successive state vector encoding corresponding to successive states of the FIFO buffer circuitry differs by a change in only one element of the state vector encoding; and
an order in which each element in the state vector encoding is updated to indicate successive states of the FIFO buffer circuitry is fixed.

Example 5. The apparatus according to example 4, wherein:
each successive state vector encoding is indicative of an additional data item provided by the source domain to the one or more data storage elements or an additional data item read into the sink domain from the one or more data storage elements.

Example 6. The apparatus according to any preceding example, wherein a Hamming distance between successive state vector encodings is one.

Example 7. The apparatus according to any preceding example, wherein:
the source state vector indicates which data storage elements contain data items provided by the source domain that are ready to be read into the sink domain and the sink domain state vector indicates which data storage elements contain data items that have already been read into the sink domain.

Example 8. The apparatus according to any of examples 4-7, wherein:
the data transfer circuitry comprises at least three data storage elements; and
the source state vector and the sink state vector each comprise at least three elements.

Example 9. The apparatus according to any of examples 4-7, wherein:
the data transfer circuitry comprises at least four data storage elements; and
the source state vector and the sink state vector each comprise at least four elements.

Example 10. The apparatus according to any preceding example, wherein:
the enable signal has a number of bits equal to the number of elements of the state vector.

Example 11. The apparatus according to any preceding example, wherein:
the respective synchronisation circuitry is configured to control the enable signal to enable the output of one or more elements of the received state vector to indicate a state the FIFO buffer circuitry in the respective domain will take on a next clock cycle.

Example 12. The apparatus according to any preceding example, wherein the synchronisation circuitry in each of the source domain and the sink domain comprises two or more data storage elements connected in series.

Example 13. The apparatus according to any preceding example, wherein for the at least one of the source domain and the sink domain, the respective data transfer control circuitry is configured to advance a respective state vector by controlling the enable signal to enable output of one or more elements of a received state vector that correspond to one or more data storage elements for which a change in state is to be signalled.

Example 14. The apparatus according to any preceding example, wherein a clock frequency in the source domain differs from a clock frequency in the sink domain by less than a predetermined timing factor.

Example 15. The apparatus according to any of examples 1-13, wherein:
the FIFO buffer circuitry further comprises an alternative synchronisation mechanism;
at least one of the source domain and the sink domain have a clock that is operable at more than one frequency; and
the FIFO buffer circuitry is configured to switch to the alternative synchronisation mechanism in response to a clock frequency in the source domain and a clock frequency in the sink domain differing by more than the predetermined timing factor.

Example 16. The apparatus according to any preceding example, wherein the one or more data storage elements comprise registers.

Example 17. The apparatus according to any preceding example, wherein:
the data transfer circuitry comprises two or more data storage elements;
at least one of the source domain transfer control circuitry and the sink domain transfer control circuitry is operable to perform a multi-item transfer to transfer two or more data items in a single clock cycle of a respective domain by:
placing the two or more data items into, or reading the two or more data items from, respective data storage elements of the two or more data storage elements; and
advancing a state vector of the respective domain by two or more state vector encodings in the single clock cycle.

Example 18. The apparatus according to example 17, wherein:
the source domain data transfer control circuitry is operable to initiate the multi-item transfer to transfer the two or more data items from the source domain to the sink domain in a single clock cycle by:
placing the two or more data items into the respective data storage elements of the two or more data storage elements; and
advancing the source state vector by two or more state vector encodings; and
wherein the sink domain data transfer control circuitry is responsive to detecting the advance in the indication of the source state vector by the two or more state vector encodings to cause the two or more data items to be read into the sink domain from the respective data storage elements.

Example 19. A method of transferring data from a source domain to a sink domain across a clock boundary using first-in, first-out (FIFO) buffer circuitry, the method comprising:
storing the data to be transferred across the clock domain boundary using one or more data storage elements;
maintaining a source state vector indicative of a state of the FIFO buffer circuitry in the source domain and a sink state vector indicative of a state of the FIFO buffer circuitry in the sink domain;
stabilising, using synchronisation circuitry in each of the source domain and the sink domain, a signal indicative of a received state vector received from the other of the source domain and the sink domain;
storing, using the synchronisation circuitry, the received state vector, wherein for at least one of the source domain and the sink domain, the respective synchronisation circuitry is clock-gated by an enable signal; and
for at least one of the source domain and the sink domain:
advancing, in response to a change in the state of the FIFO buffer circuitry in the respective domain, the respective state vector by controlling the enable signal to enable output of one or more elements of the received state vector.

Example 20. A non-transitory computer-readable medium to store computer-readable code for fabrication of an apparatus comprising:
first-in, first-out (FIFO) buffer circuitry to transfer data from a source domain to a sink domain across a clock domain boundary, the FIFO buffer circuitry comprising:
data transfer circuitry comprising one or more data storage elements to store the data to be transferred across the clock domain boundary;
source domain data transfer control circuitry to maintain a source state vector indicative of a state of the FIFO buffer circuitry in the source domain and sink domain data transfer control circuitry to maintain a sink state vector indicative of a state of the FIFO buffer circuitry in the sink domain;
synchronisation circuitry in each of the source domain and the sink domain to stabilise a signal indicative of a received state vector received from the other of the source domain and the sink domain and to store the received state vector;
wherein for at least one of the source domain and the sink domain:
the respective synchronisation circuitry is clock-gated by an enable signal; and
the respective synchronisation circuitry is responsive to a change in the state of the FIFO buffer circuitry in the respective domain to advance the respective state vector by controlling the enable signal to enable output of one or more elements of the received state vector.

Example 21. An apparatus comprising:
first-in, first-out (FIFO) buffer circuitry to transfer data from a source domain to a sink domain across a clock domain boundary, the FIFO buffer circuitry comprising:
data transfer circuitry comprising at least three data storage elements to store the data to be transferred across the clock domain boundary; and
data transfer control circuitry to maintain, for each of the source domain and the sink domain, a respective state vector indicative of a state of the FIFO buffer circuitry in the respective domain;
wherein the data transfer control circuitry is configured to maintain the state vector for each of the source domain and the sink domain according to an encoding for which:
each element of the state vector represents a state of a corresponding data storage element;
the state vector for successive states of the FIFO buffer circuitry differs by a change in only one element of the state vector; and
an order in which each element is updated to indicate successive states of the FIFO buffer circuitry is fixed.

Example 22. A method of transferring data from a source domain to a sink domain across a clock domain boundary using first-in, first-out (FIFO) buffer circuitry, the method comprising:
storing the data to be transferred across the clock domain boundary using at least three data storage elements;
maintaining, for each of the source domain and the sink domain, a respective state vector indicative of a state of the FIFO buffer circuitry in the respective domain;
wherein state vector for each of the source domain and the sink domain are maintained according to an encoding for which:
each element of the state vector represents a state of a corresponding data storage element;

the state vector for successive states of the FIFO buffer circuitry differs by a change in only one element of the state vector; and an order in which each element is updated to indicate successive states of the FIFO buffer circuitry is fixed.

Example 23. A non-transitory computer-readable medium to store computer-readable code for fabrication of an apparatus comprising:

first-in, first-out (FIFO) buffer circuitry to transfer data from a source domain to a sink domain across a clock domain boundary, the FIFO buffer circuitry comprising:

data transfer circuitry comprising at least three data storage elements to store the data to be transferred across the clock domain boundary; and data transfer control circuitry to maintain, for each of the source domain and the sink domain, a respective state vector indicative of a state of the FIFO buffer circuitry in the respective domain;

wherein the data transfer control circuitry is configured to maintain the state vector for each of the source domain and the sink domain according to an encoding for which:

each element of the state vector represents a state of a corresponding data storage element;

the state vector for successive states of the FIFO buffer circuitry differs by a change in only one element of the state vector; and an order in which each element is updated to indicate successive states of the FIFO buffer circuitry is fixed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

first-in, first-out (FIFO) buffer circuitry to transfer data from a source domain to a sink domain across a clock domain boundary, the FIFO buffer circuitry comprising:

data transfer circuitry comprising one or more data storage elements to store the data to be transferred across the clock domain boundary;

source domain data transfer control circuitry to maintain a source state vector indicative of a state of the FIFO buffer circuitry in the source domain and sink domain data transfer control circuitry to maintain a sink state vector indicative of a state of the FIFO buffer circuitry in the sink domain;

synchronisation circuitry in each of the source domain and the sink domain to stabilise a signal indicative of a received state vector received from the other of the source domain and the sink domain and to store the received state vector;

wherein for at least one of the source domain and the sink domain:

the respective synchronisation circuitry is clock-gated by an enable signal; and the respective synchronisation circuitry is responsive to a change in the state of the FIFO buffer circuitry in the respective domain to advance the respective state vector by controlling the enable signal to enable output of one or more elements of the received state vector.

2. The apparatus according to claim 1, wherein:

for both the source domain and the sink domain:

the respective synchronisation circuitry is clock-gated by an enable signal; and the respective data transfer control circuitry is responsive to a change in the state of the FIFO buffer circuitry in the respective domain to advance the respective state vector by controlling the respective enable signal to enable output of one or more elements of a respective received state vector.

3. The apparatus according to claim 2, wherein:

the synchronisation circuitry in the source domain and the synchronisation circuitry in the sink domain, together with an inverter, form a loop.

4. The apparatus according to claim 1, wherein:

the source domain data transfer control circuitry and the sink domain data transfer control circuitry are configured to maintain the source state vector and the sink state vector according to a state vector encoding for which:

each element of the state vector encoding represents a state of a corresponding data storage element;

successive state vector encoding corresponding to successive states of the FIFO buffer circuitry differs by a change in only one element of the state vector encoding; and an order in which each element in the state vector encoding is updated to indicate successive states of the FIFO buffer circuitry is fixed.

5. The apparatus according to claim 4, wherein:

each successive state vector encoding is indicative of an additional data item provided by the source domain to the one or more data storage elements or an additional data item read into the sink domain from the one or more data storage elements.

6. The apparatus according to claim 1, wherein a Hamming distance between successive state vector encodings is one.

7. The apparatus according to claim 1, wherein:

the source state vector indicates which data storage elements contain data items provided by the source domain that are ready to be read into the sink domain and the sink domain state vector indicates which data storage elements contain data items that have already been read into the sink domain.

8. The apparatus according to claim 4, wherein:

the data transfer circuitry comprises at least three data storage elements; and the source state vector and the sink state vector each comprise at least three elements.

9. The apparatus according to claim 4, wherein:

the data transfer circuitry comprises at least four data storage elements; and the source state vector and the sink state vector each comprise at least four elements.

10. The apparatus according to claim 1, wherein:
the enable signal has a number of bits equal to the number of elements of the state vector.

11. The apparatus according to claim 1, wherein:
the respective synchronisation circuitry is configured to control the enable signal to enable the output of one or more elements of the received state vector to indicate a state the FIFO buffer circuitry in the respective domain will take on a next clock cycle.

12. The apparatus according to claim 1, wherein the synchronisation circuitry in each of the source domain and the sink domain comprises two or more data storage elements connected in series.

13. The apparatus according to claim 1, wherein for the at least one of the source domain and the sink domain, the respective data transfer control circuitry is configured to advance a respective state vector by controlling the enable signal to enable output of one or more elements of a received state vector that correspond to one or more data storage elements for which a change in state is to be signalled.

14. The apparatus according to claim 1, wherein a clock frequency in the source domain differs from a clock frequency in the sink domain by less than a predetermined timing factor.

15. The apparatus according to claim 1, wherein:
the FIFO buffer circuitry further comprises an alternative synchronisation mechanism;
at least one of the source domain and the sink domain have a clock that is operable at more than one frequency; and
the FIFO buffer circuitry is configured to switch to the alternative synchronisation mechanism in response to a clock frequency in the source domain and a clock frequency in the sink domain differing by more than the predetermined timing factor.

16. The apparatus according to claim 1, wherein the one or more data storage elements comprise registers.

17. The apparatus according to claim 1, wherein:
the data transfer circuitry comprises two or more data storage elements;
at least one of the source domain transfer control circuitry and the sink domain transfer control circuitry is operable to perform a multi-item transfer to transfer two or more data items in a single clock cycle of a respective domain by:
placing the two or more data items into, or reading the two or more data items from, respective data storage elements of the two or more data storage elements; and
advancing a state vector of the respective domain by two or more state vector encodings in the single clock cycle.

18. The apparatus according to claim 17, wherein:
the source domain data transfer control circuitry is operable to initiate the multi-item transfer to transfer the two or more data items from the source domain to the sink domain in a single clock cycle by:
placing the two or more data items into the respective data storage elements of the two or more data storage elements; and
advancing the source state vector by two or more state vector encodings; and wherein the sink domain data transfer control circuitry is responsive to detecting the advance in the indication of the source state vector by the two or more state vector encodings to cause the two or more data items to be read into the sink domain from the respective data storage elements.

19. A method of transferring data from a source domain to a sink domain across a clock boundary using first-in, first-out (FIFO) buffer circuitry, the method comprising:
storing the data to be transferred across the clock domain boundary using one or more data storage elements;
maintaining a source state vector indicative of a state of the FIFO buffer circuitry in the source domain and a sink state vector indicative of a state of the FIFO buffer circuitry in the sink domain;
stabilising, using synchronisation circuitry in each of the source domain and the sink domain, a signal indicative of a received state vector received from the other of the source domain and the sink domain;
storing, using the synchronisation circuitry, the received state vector, wherein for at least one of the source domain and the sink domain, the respective synchronisation circuitry is clock-gated by an enable signal; and
for at least one of the source domain and the sink domain:
advancing, in response to a change in the state of the FIFO buffer circuitry in the respective domain, the respective state vector by controlling the enable signal to enable output of one or more elements of the received state vector.

20. A non-transitory computer-readable medium to store computer-readable code for fabrication of an apparatus comprising:
first-in, first-out (FIFO) buffer circuitry to transfer data from a source domain to a sink domain across a clock domain boundary, the FIFO buffer circuitry comprising:
data transfer circuitry comprising one or more data storage elements to store the data to be transferred across the clock domain boundary;
source domain data transfer control circuitry to maintain a source state vector indicative of a state of the FIFO buffer circuitry in the source domain and sink domain data transfer control circuitry to maintain a sink state vector indicative of a state of the FIFO buffer circuitry in the sink domain;
synchronisation circuitry in each of the source domain and the sink domain to stabilise a signal indicative of a received state vector received from the other of the source domain and the sink domain and to store the received state vector;
wherein for at least one of the source domain and the sink domain:
the respective synchronisation circuitry is clock-gated by an enable signal; and
the respective synchronisation circuitry is responsive to a change in the state of the FIFO buffer circuitry in the respective domain to advance the respective state vector by controlling the enable signal to enable output of one or more elements of the received state vector.

* * * * *